(12) United States Patent
Wakefield et al.

(10) Patent No.: US 8,240,079 B2
(45) Date of Patent: Aug. 14, 2012

(54) FISHING POLE TENDER SYSTEM

(75) Inventors: Stephen Wakefield, Orlando, FL (US);
Martin Schaus, Burmingham, MI (US)

(73) Assignee: Moto, LLC, Hobe Sound, FL (US)

( * ) Notice: Subject to any disclaimer, the term of this patent is extended or adjusted under 35 U.S.C. 154(b) by 1121 days.

(21) Appl. No.: 11/670,299

(22) Filed: Feb. 1, 2007

(65) Prior Publication Data

US 2008/0184611 A1 Aug. 7, 2008

(51) Int. Cl.
*A01K 97/10* (2006.01)
(52) U.S. Cl. ........................................... 43/21.2
(58) Field of Classification Search ................. 43/21.2, 43/25; 248/215
See application file for complete search history.

(56) References Cited

U.S. PATENT DOCUMENTS

| | | | |
|---|---|---|---|
| 2,626,770 A | 1/1953 | Norman | |
| 2,879,023 A | 3/1959 | Barrier et al. | 248/231.41 |
| 2,967,691 A | 1/1961 | Lehnbeuter et al. | 248/312.1 |
| 2,992,804 A | 7/1961 | Doran | 248/311.2 |
| 3,021,106 A | 2/1962 | Kramer | 248/231.71 |
| 3,140,849 A * | 7/1964 | Garr et al. | 248/304 |
| 4,156,982 A | 6/1979 | Phillips, Jr. | |
| 4,252,059 A | 2/1981 | Simeth | |
| 4,323,181 A | 4/1982 | Spasoff | 224/674 |
| 4,497,129 A | 2/1985 | Chestnut | |
| 4,517,761 A | 5/1985 | Bleggi | |
| 4,528,768 A * | 7/1985 | Anderson | 43/21.2 |
| 4,727,890 A | 3/1988 | Vincent | 131/329 |
| 4,858,869 A | 8/1989 | Stang | 248/311.2 |
| 4,871,099 A | 10/1989 | Bogar, Jr. | |
| 5,054,738 A | 10/1991 | Harding | |
| 5,105,574 A | 4/1992 | Fast | 43/21.2 |
| D334,226 S | 3/1993 | Engle | |
| 5,247,759 A | 9/1993 | Noriega | |
| D349,041 S | 7/1994 | Wical | D8/373 |
| 5,329,728 A | 7/1994 | Ray | 47/67 |
| 5,414,953 A | 5/1995 | Taylor | |
| 5,463,974 A | 11/1995 | Seeder | 116/173 |
| D365,015 S * | 12/1995 | Avinger | D8/373 |
| 5,535,971 A * | 7/1996 | Adams | 248/215 |
| D374,168 S * | 10/1996 | Protz, Jr. | D8/373 |
| 5,561,937 A | 10/1996 | Johnson | |
| 5,607,131 A * | 3/1997 | Adams | 248/215 |
| 5,617,980 A * | 4/1997 | Parsons et al. | 224/251 |
| 5,664,367 A | 9/1997 | Huang | 47/40 |
| 5,913,673 A | 6/1999 | Womac | |
| 5,915,942 A * | 6/1999 | Ratliffe | 43/21.2 |
| 5,938,160 A | 8/1999 | Hartmann et al. | 248/311.2 |

(Continued)

*Primary Examiner* — Timothy D Collins
*Assistant Examiner* — Valentina Xavier
(74) *Attorney, Agent, or Firm* — Akerman Senterfitt; Mark D. Passler

(57) ABSTRACT

A fishing pole tender system for attachment to a support structure that includes a generally rigid base with a first side and a second side opposite the first side. The first side and the second side are physically connected and spatially separated by an intermediate portion such that a support structure fits between the first side and the second side. The first side, the second side or both, may include at least one accessory mounting portion for interchangeably mounting fishing accessories to the base. One or more fishing pole holders are securely attached to the base. The first side, the second side, or both may include a indented portion comprising an arcuate or v-shaped form, a slanted portion, or a combination thereof. The indented portion provides improved attachment to a support structure by imparting compressive force onto a support structure.

17 Claims, 20 Drawing Sheets

U.S. PATENT DOCUMENTS

| | | | |
|---|---|---|---|
| D413,769 S | 9/1999 | Mason | D7/620 |
| 6,029,872 A | 2/2000 | Ellington | 224/251 |
| D423,884 S | 5/2000 | Greenwood | D7/620 |
| 6,253,484 B1 | 7/2001 | O'Connor | |
| 6,367,403 B1 * | 4/2002 | Carter | 114/343 |
| 6,601,817 B2 | 8/2003 | Schwebke | |
| 6,609,673 B1 * | 8/2003 | Johnson | 242/423.1 |
| 6,641,099 B1 | 11/2003 | Lue | |
| 6,672,559 B1 | 1/2004 | Boldia | |
| 6,742,757 B2 | 6/2004 | Fox | |
| 6,755,145 B2 * | 6/2004 | Bolebruch | 114/347 |
| D496,233 S | 9/2004 | Young et al. | D7/691 |
| 6,857,608 B2 * | 2/2005 | Avinger | 248/215 |
| 6,898,893 B1 * | 5/2005 | Mukdaprakorn | 43/21.2 |
| 6,962,018 B1 | 11/2005 | King | |
| 7,140,507 B2 | 11/2006 | Maldonado et al. | |
| D533,445 S | 12/2006 | Janzen | D8/380 |
| 7,200,968 B2 * | 4/2007 | Jaworski | 43/21.2 |
| 2003/0230024 A1 | 12/2003 | Roberson | |
| 2003/0230684 A1 | 12/2003 | Clary | |
| 2005/0005500 A1 * | 1/2005 | Howley | 43/21.2 |
| 2005/0039377 A1 | 2/2005 | Clary | |
| 2005/0126064 A1 | 6/2005 | Winkler | |
| 2005/0155276 A1 | 7/2005 | O'Keeffe | |
| 2005/0235548 A1 * | 10/2005 | Barron et al. | 43/21.2 |
| 2006/0076377 A1 | 4/2006 | Moodie | 224/251 |
| 2006/0254118 A1 | 11/2006 | Warecke | |
| 2008/0134565 A1 | 6/2008 | Sutherland et al. | |
| 2008/0155881 A1 | 7/2008 | Carnevali | |

* cited by examiner

FISHING POLE TENDER SYSTEM

STATEMENT REGARDING FEDERALLY SPONSORED RESEARCH OR DEVELOPMENT

Not applicable.

FIELD OF INVENTION

This invention relates generally to a fishing pole tender system including fishing pole holder and interchangeably mounted fishing accessories, that can be temporarily attached to a support structure.

BACKGROUND

Fishing is a popular form of recreation, and source of fresh seafood for individuals with access to lakes, rivers, oceans and other water bodies where fish can be found. The most common form of recreational fishing, angling, uses a pole, reel, line, hooks and any of a wide range of baits, both living and man-made. Other devices, commonly referred to as tackle, may be used to compliment the presentation of the bail to fee targeted fish. Some examples of tackle include lures, weights, and floats. Additionally, anglers commonly carry first aid kits and tools, such as pliers, knives, aid screw drivers. These tools are used to change hooks or lures, cut leader wire or fishing line, remove hooks from fish, clean and fillet fish, and other aspects of fishing.

As is well knows, it may take an extended period of fishing for the angler to catch a fish. While waiting for a fish to bite, the angler may need to put down his fishing pole to use his hands to attend to something else or otherwise leave the fishing pole unattended. If the pole is simply led on a surface unattended, die pole may be pulled into the water or along the surface and be lost or damaged when a fish takes the bait. In addition, if the angler cannot see whether the fishing line is pulled taught, he may not notice that a bah has taken the bait. This is critical, since the chances die fish will take the bait without, being caught increases if an angler does not set the hook in the fish's mouth shortly after the fish takes the halt. Recognition of these deficiencies led to the development of devices for tending to a fishing pole while an angler uses his hands for something else.

Once a fish is caught, anglers who intend to eat their catch need to clean the fish shortly after the fish is killed or the meat will spoil. Cleaning the fish is a messy task that most anglers prefer doing with easy access to a water body for disposal of any waste. Thus, most anglers prefer to clean and fillet their catch where the catch is made. This often requires anglers to clean and fillet their catch using a cutting board placed on the ground or a narrow railing, or wait their turn at busy public access cleaning tables. Each of these alternatives is inconvenient. Thus, there is a need for a convenient method of cleaning fish where the catch is made.

Anglers often use a tackle box to carry their tackle, fishing tools, cutting boards and first aid kits. Typically, the tackle box is left, on the ground and the angler must bend, over each time he wishes to access something from the tackle box, if there is a flat railing, the angler has the option of balancing items, such as the tackle box, on the railing, lithe railing is not flat, the angler cannot even hope to balance the tackle box on the railing. Obviously, even if the railing is flat, balancing an item, on the rail creates a significant risk that the item will fall into the water. Similar considerations exist with respect to beverages which the angler wishes to consume while fishing. Thus, there is a need for a convenient means of securely attaching frequently used items in a more convenient and secure manner than currently used, especially whom a flat railing is not available.

Fishing pole holders are known in the art. U.S. Pat. No. 4,156,982 describes a unitary support for a fishing rod with spaced parallel plates that may straddle a bridge railing or the gunwale of a boat. The plates are rigidly connected by a trough, which may be used as a storage space. The unitary support is attached to a bridge railing or boat gunwale using an adjustable clamping screw. The fishing pole rests in a notch in one of the parallel plates and through a hole of the other parallel plate.

U.S. Pat. No. 5,054,738 describes a utility device designed to securely hold one or more fishing rods and a single beverage container. The utility device includes spaced parallel plates creating an inverted, U-shaped configuration for attachment to a dock rail or boat rail. The utility device is attached to a rail using a pin that passes through a hole in each leg of the U-shaped portion before a cotter pin is inserted in a hole in the tip of the pin.

U.S. Pat. No. 5,561,937 describes a fishing rod holder with a triangular support brace having a recess dimensioned to receive an elongated hollow tube for holding a fishing pole. The triangular support brace can be positioned atop a bridge rail and may be secured using a strap that wraps around both die triangular support brace and the rail. A dangling pouch may be temporarily smoked to the strap using a button snap.

U.S. Patent Application Publication 2005/0039377 describes a fishing post cap with a square shaped recess funned from two sets of opposing sides that are parallel to one another. The fishing post cap is a unitary device that permanently includes accessories such as cup holders, mini-tackle boxes, a fishing pole holder and gear hooks. The gear books may be used to bang items such as towels, a live welt, a fish basket, and a fish stringer.

While the prior art provides devices for tending a fishing pole that includes integrally attached fishing accessories, none of the poor art devices provide a fishing pole tender system, having a base with two sides including one side that has a non-parallel, resiliently deformable indented port cm that provides improved attachment by exerting force on a support structure. In addition, none of the prior art devices provide a fishing pole tender system that includes a multitude of interchangeable, cantilever mountable fishing accessories, such as cutting boards, tackle boxes, and bait buckets, that may be securely and conveniently mounted to one or more accessory mounting portions. Thus, there is a need for improved fishing rod holders.

SUMMARY OF THE INVENTION

The present invention is directed to a fishing pole tender system for attachment to a support structure. The fishing pole tender system can include a base with a generally rigid, unitary frame and can have a first sole and a second side opposite the first side. The first side and the second side can be physically connected and spatially separated by an intermediate portion so that a support structure can fit between the first side and the second side with the intermediate portion resting on the support structure. The second side can include an indented portion. The indented portion can have an arcuate shape, a v-shaped shape, a slanted portion, or a combination thereof, where the indented portion provides unproved attachment by imparting compressive force onto a support structure. The indented portion can be resiliently deformable such that the base can be securely placed on a support structure by sliding the base over & support structure. The indented portion can be arcuate.

The fishing pole tender system can also include at least one fishing pole holder comprising an elongated hollow sleeve having an open first end, wherein the at least one fishing pole holder is securely attached to the first side or the second side.

The fishing pole tender system can be used on a large number of supports, such as reds or deck posts. Since the base includes a resiliently deformable indented portion, the fishing pole tender system can easily be securely placed on a support structure by pushing the base onto the support structure. Once properly placed on a support structure, the resiliently deformable indented, portion cart exert sufficient force on the support structure that the fishing pole tender system remains steady without the need for additional securing means. Thus, the angler can quickly set up the fishing pole system with one hand while holding the fishing pole in the other hand.

The first side of the fishing tender system, the second side of the fishing wader system, or both, can include at least one accessory mounting portion for interchangeably mounting one or more fishing accessories to the base. When the bane of the fishing tender system is attached to a support structure, the first side and the second side can extend generally vertically and the intermediate portion can extend generally horizontally.

In another embodiment, the present invention is directed to a fishing pole tender system for attachment to a support structure. The fishing pole tender system can include a base with a generally rigid name and can have a first side and a second side opposite the first sale. The first side and the second side can be physically connected and spatially separated by an intermediate portion such that a support structure can fit between the first side and the second side and the intermediate portion resting on the support structure. When the base is temporarily attached to a support structure, the first side and the second side can extend generally vertically and the intermediate portion can extend generally horizontally. The first side, the second side, or both, can include at least one accessory mounting portion for interchangeably mounting a plurality of fishing accessories to the base. The fishing pole tender system can also include at least one fishing pole holder comprising an elongated hollow sleeve having an open turn end, wherein the at least one fishing pole holder can be securely attached to the first side of the base.

The fishing pole tender system can be used on a large number of supports, such as rails or deck posts. The base can be adjustable, so that the base will not protrude any further than necessary once securely attached to a support structure. The fishing pole tender system also includes a number of fishing accessories for interchangeably mounting to the frame. This allows the angler to attach one or more fishing accessories that may be useful while fishing. For instance, the angler may initially attach a drink holder and a tackle box at the outset of his fishing trip. The angler may switch, from a lure to live bait and replace the tackle box with a bait bucket. Finally, the angler may replace the drink holder and bait bucket with a cutting board to clean the fish before returning home to cook the catch.

The base can include a first L-shaped portion and a second L-shaped portion. The first L-shaped portion can include a first leg and a second leg, where the first leg of the first L-shaped portion can be the first side of the base and the second leg of the first L-shaped portion can be a turn concocting side. The second L-shaped portion can include a first leg and a second leg, where the first leg of the second L-shaped portion can be the second side of the base and the second leg of the second L-shaped portion cart be a second connecting side. The connecting sides of the L-shaped portions can be the intermediate portion of the base. The length of the intermediate portion can be adjusted by controlling the amount of overlap between, the connecting sides. The connecting sides can include a locking mechanism for setting the gap between the first side and the second side and enable secure attachment of the fishing pole tender system to support structures of different sizes. The first and second L-shaped portions can be slidably adjustable to fit support structures of varying widths.

In either embodiment, the fishing pole tender system can also include at least one fishing accessory for cantilevered mounting to the at least one accessory mounting portion. The at least one fishing accessory for cantilevered mounting can be a tackle box, a halt bucket, a cutting board, a light holder, a tool holder, a drink holder, or a combination thereof. The at least one accessory mounting portion of the fishing pole tender system may be a bracket, bracket and slot, screw and keyhole, snap hp key and slot, screw and nut, hook and loop, whether fabric or otherwise, or a combination thereof.

At least one of the first side and the second side can include a securing screw for improving attachment of the base to a support structure. The hashing pole tender system can be mounted on at least one of a dock rail, a jetty rail, a boat rail, a bridge rail, or other similar support structures.

The base may include a resilient material, such that the base cart return to the original shape of the base after the base is flexed during attachment to a support structure. The base can include a material including metals, alloys, injection molded plastics, PVC, fibers and combinations thereof. The fishing pole tender system can also include a hushing to enhance attachment of the base to the support structure, protect the surface of a support structure from the base, or both.

The at least one fishing pole holder can be securely attached to the first side of the base such that the at least one fishing pole holder is oriented generally vertically. A plurality of fishing pole holders can be attached to a multi-rod mount that is securely attached to the first side of the base and each fishing pole holder can be oriented in a plane parallel to that defined by a hunt surface of the first side of the base. The open first end of the fishing pole holder can include a notch for receiving a fishing reel, wherein the notch allows better force transfer from a fishing pole in the fishing pole holder to the base.

The fishing pole tender system may also include at least one bastion brake for slidably moving along the first side, the second side, or both. When the friction brake is slidably forced against a support structure; to which the base is temporarily attached, the friction brake can prevent the base from rotating due to lateral forces applied to the base.

In at least one embodiment, the invention can provide a convenient fishing pole tender systems that securely holds a fishing pole and can be attached to dock rails, jetty rails, boat rails, and bridge rails, even if the railing is not flat.

In at least one embodiment, invention can provide a fishing pole tender system that allows anglers to securely and interchangeably mount fishing accessories to the fishing pole tender system where the fishing accessories are conveniently accessed end used, by the angler while fishing.

In at least one embodiment, the invention can provide cantilevered mounting of fishing accessories far easier use of mounted fishing accessories and enabling mounting of more fishing accessories, for example bait buckets, tackle boxes, and cutting boards.

Another advantage of the invention is that it provides a fishing pole tender system that allows anglers to sequentially attach different fishing accessories to the fishing pole tender system as the fishing accessory becomes useful.

Another advantage of the invention is that it provides interchangeable fishing accessories that may be attached to the fishing pole tender system at one or more locations both simultaneously and sequentially.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 14A depicts a bait bucket. FIG. 14B depicts a cutting board, and FIG. 14C depicts a light holder.

DETAILED DESCRIPTION

Figure 1:
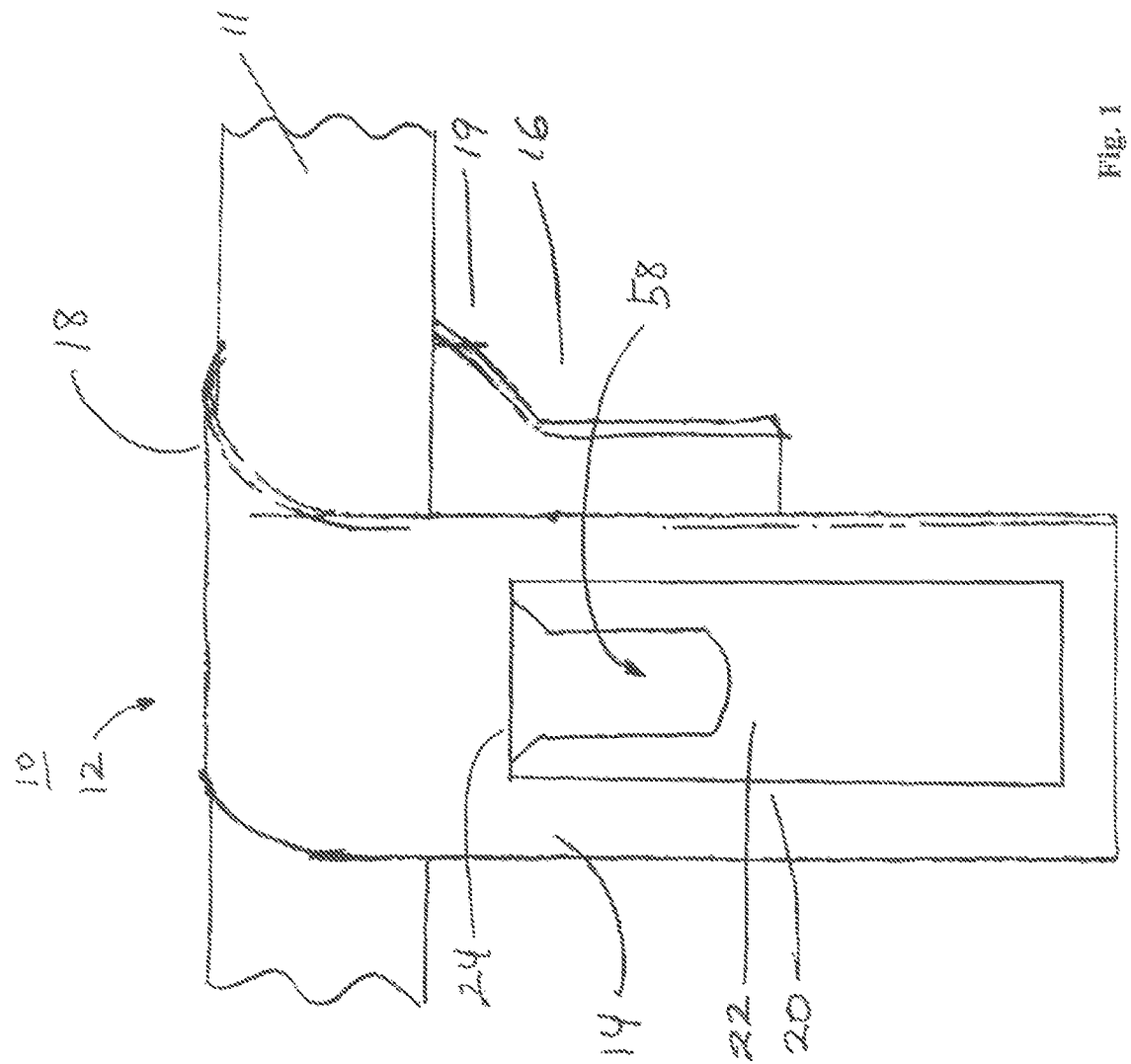
FIG. 1 is a front view of a fishing pole tender system of the present invention, including a base and a fishing pole holder.

As shown in FIGS. 1-9, this invention is directed to a fishing pole tender system 10 for attachment to a support structure 11. The fishing pole tender system 10 can include a base 12 with a generally rigid frame and can have a first side 14 and a second side 16 opposite the first side 14. The best side 14 and the second side 16 can be physically connected and spatially separated by an intermediate portion 18 so that a support structure 11 can fit between the first side 14 and die second side 16 and the intermediate portion 18 can rest on the support structure 11. The first side 14, the second side 16, or both ear include an indented portion 19 which can provide improved attachment to a support structure by imparting compressive force onto a support structure 11. The indented portion 19 can be resiliently deformable such that the base 12 can be temporarily attached to a support structure 11 by sliding the base 12 over the support structure 11. The fishing pole tender system 10 can also include at least one fishing pole holder 20 comprising an elongated hollow sleeve 22 having an open first end 24, wherein the at least one fishing pole holder 20 is securely attached to the first side 14 or the second side 16. The base 12 may be unitary.

The base 12 can be made of a resilient material that enables the base 12 to return to the original shape of the base 12 after the base 12 is flexed during attachment to, or removal from, a support structure 11. The base 12 can be made of any suitable material including metals, alloys, injection molded plastics, PVC, fibers, and combinations thereof. The fishing pole tender system 10 can also include a bashing 62 to enhance attachment of the base 12 to the support structure 11, protect the surface 13 of a support structure 11 from the base 12, or both.

While anglers sometime fish from the shore of a water body, in order to gain, access to deeper water and underwater features that attract fish anglers often fish on a boat or a man-made surface that extends over the surface of a water body. Boats and the man-made surfaces discussed above nearly always include rails designed to prevent people born hailing off of the structure into the water. With this in mind, the fishing pole tender system 10 can be designed to securely mount on a dock rail, a jetty rail, a boat rail, a bridge rail, or other similar support structures. As used herein, "rail" has its normal meaning and also includes walls, support beams, posts and other structural components of boats, docks, jetties, bridges and other mane-wale surfaces that extend over the surface of a water body.

In one aspect of the present invention, the fishing pole tender system 10 includes an indented portion 10 designed to impart compressive force onto a support structure 11, conform to the shape of a support structure if or both. The indented portion 19 can have an arcuate shape, a V-shape, a slanted portion, and combinations thereof.

Figure 2:
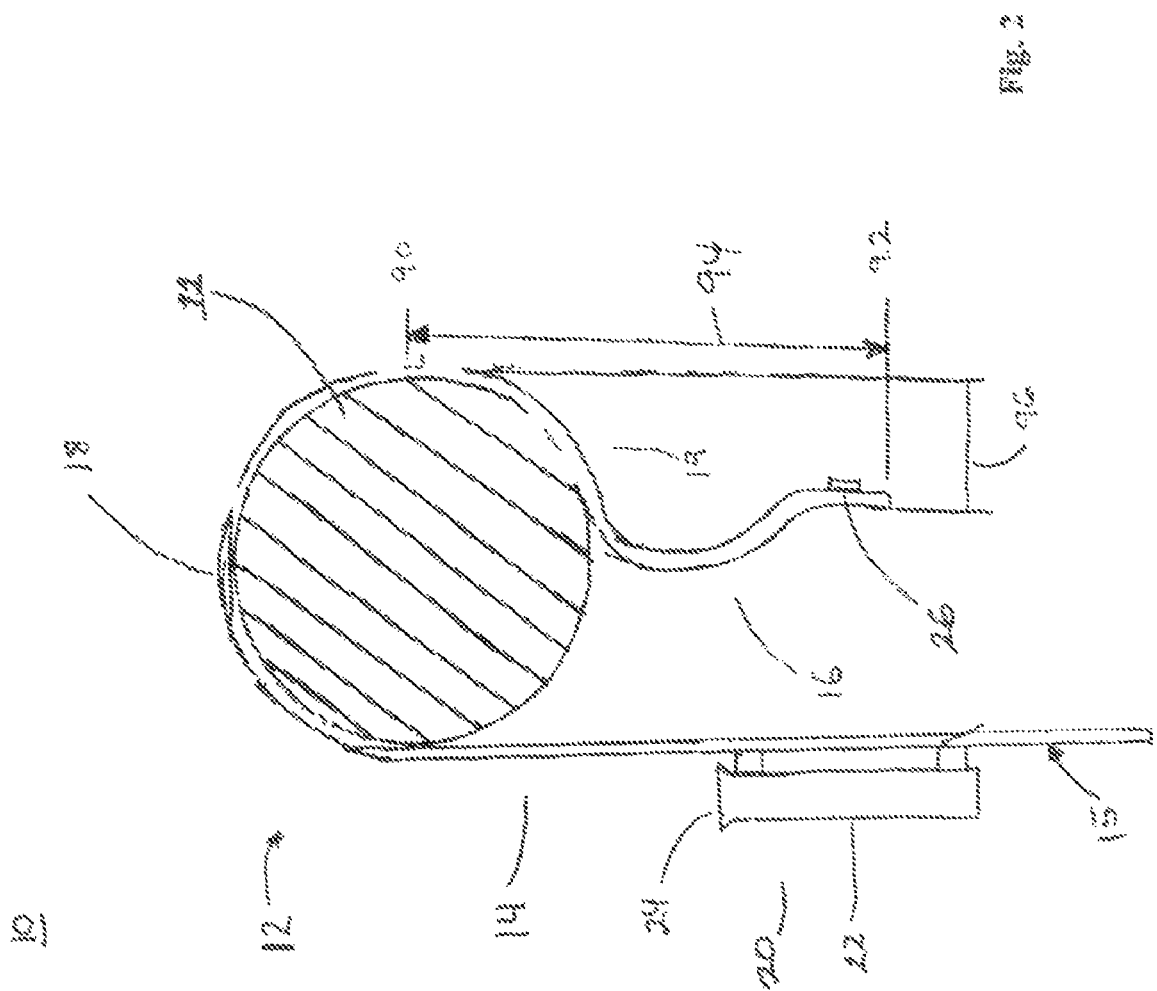
FIG. 2 is a side view of the fishing pole tender system of the FIG. 1 mounted on a round support structure, where the fishing pole fender system includes a base, a fishing pole holder, art accessory mounting portion, and an arcuate indented portion.
Figure 3:
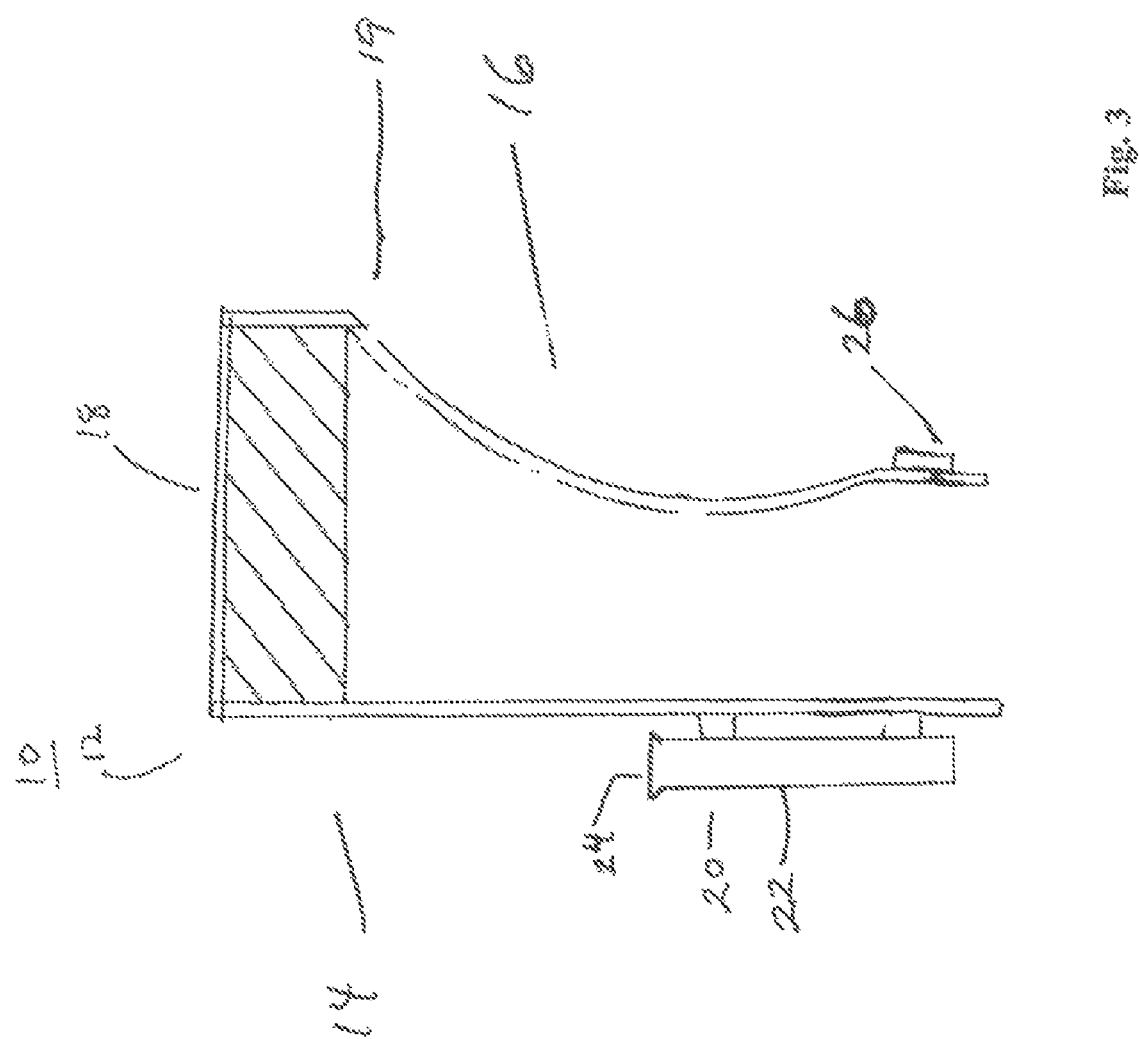
FIG. 3 is a side view of a fishing pole tender system of the present invention mounted on a rectangular support structure, where the fishing pole tender system includes a base, a fishing pole holder, an accessory mounting portion, and an arcuate indented portion.

As shown in FIGS. 1-3, the indented portion 19 may be shaped to conform in a support structure such as a round metallic rail or a wooden rail. In FIGS. 1-3, the indented portion 19 is an arcuate portion used to slide the base 12 over the support structure 11. Although the base 12 is generally rigid, it can also be resiliently deformable when attaching or removing the base 12 from the support structure 11. In one embodiment, only a portion of the base 12, for example the indented portion 19, can be resiliently deformable. As clearly shown in FIGS. 1-3, the indented portion 19 can be used to conform to the shape of the support, structure 11. The indented portion 19 of FIGS. 1-3 can also be used to impart a force onto the support structure 11.

As shown in FIGS. 4-7, the indented portion 19 can be shaped to impart a force onto a support structure 11. As shown in FIGS. 4-7, when the base is attached to a support structure 11, the shape of the indented portion 19 and the size of the support structure 11 may result in the indented portion 19 imparting a force, such as a compressive three, on the support structure 11. Because the indented portion 19 may be resiliently deformable, the distance between the first side 14 and the second side 16 in a resting position without the support structure 11 disposed between, the sides 14, 16 may be smaller than the width of the support structure 11. In such a situation, once the base 12 is pushed over the support structure 11, the indented portion 19 will exert a force against the support structure 11 as the base 12 attempts to return to the original shape of the base 12.

Figure 4:
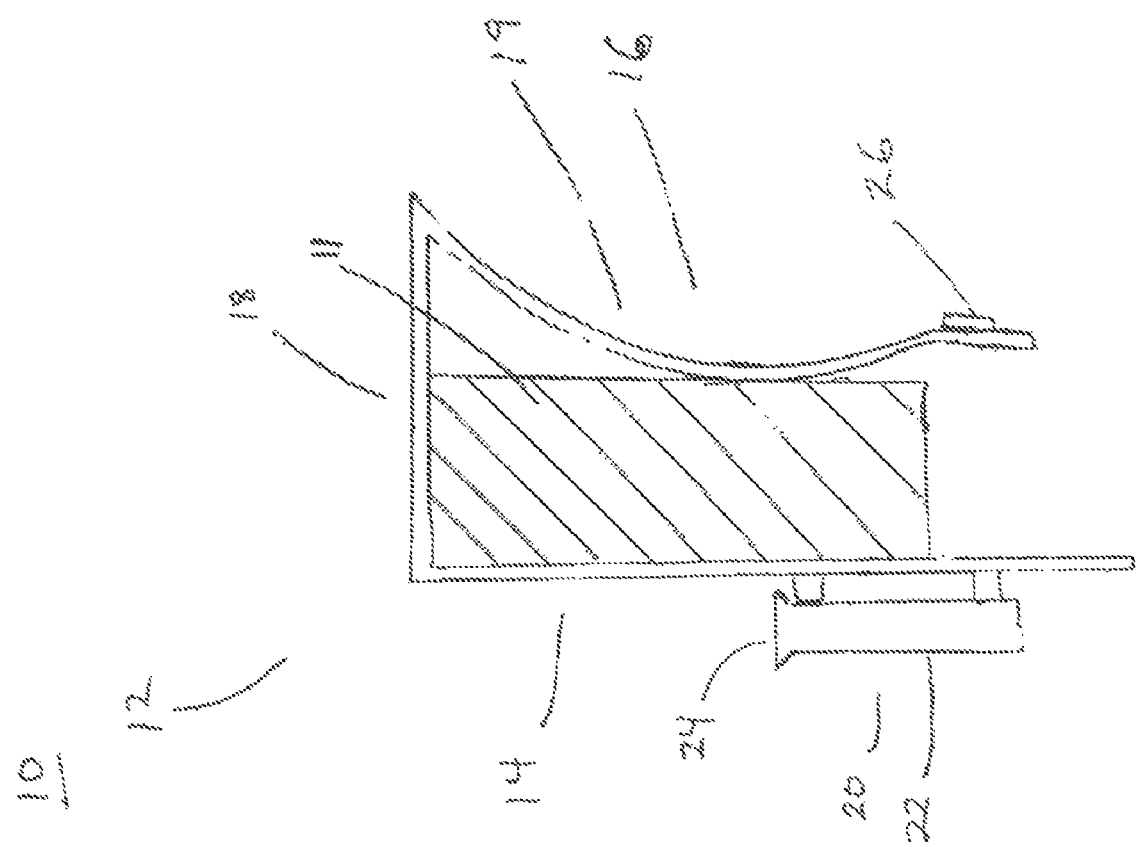
FIG. 4 is a side view of a fishing pole tender system of the present invention mounted on a rectangular support structure, where the fishing pole tender system includes a base, a fishing pole holder, an accessory mounting portion, and an arcuate indented portion.
Figure 5:
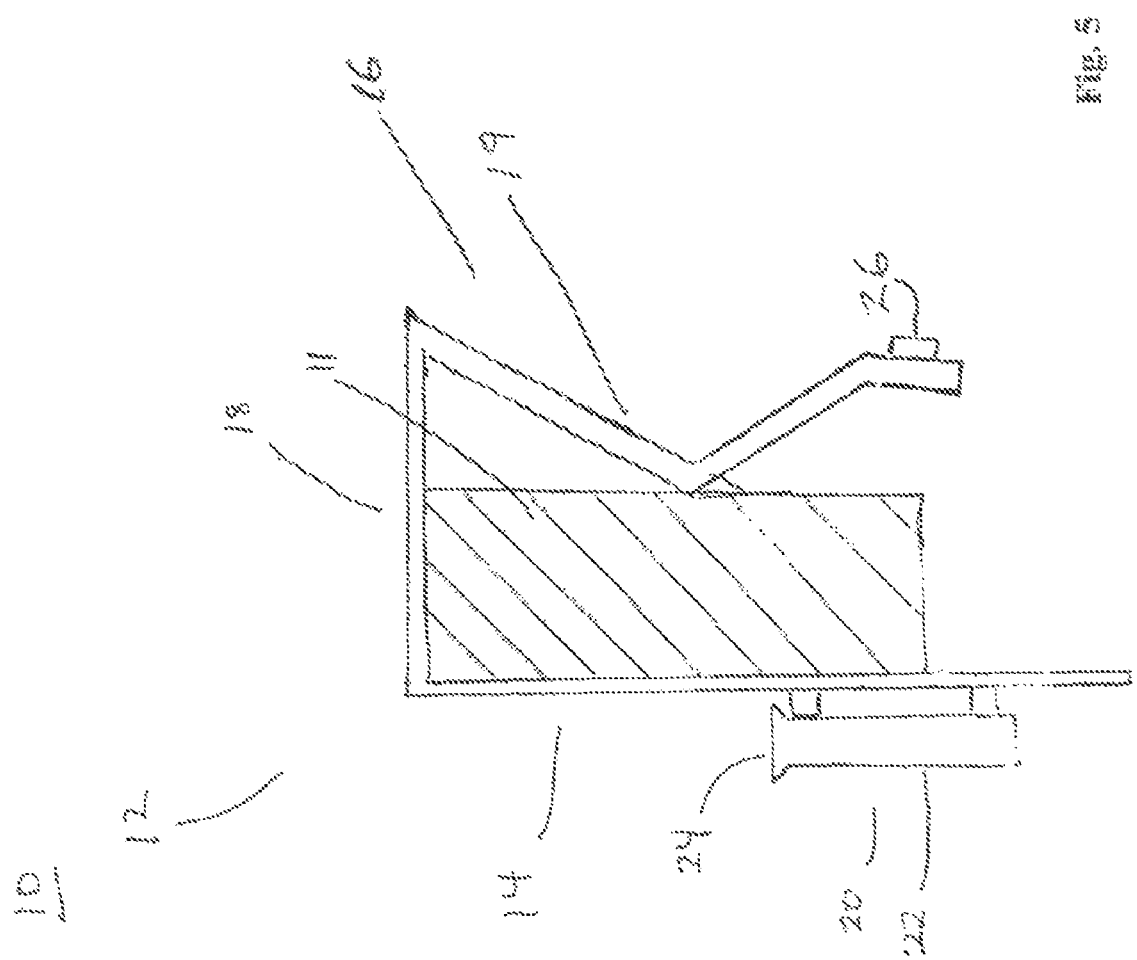
FIG. 5 is a side view of a fishing pole tender system of the present invention mounted on a rectangular support structure, where the fishing pole tender system includes a base, a fishing pole holder, an accessory mounting portion, and a v-shaped indented portion.
Figure 6:
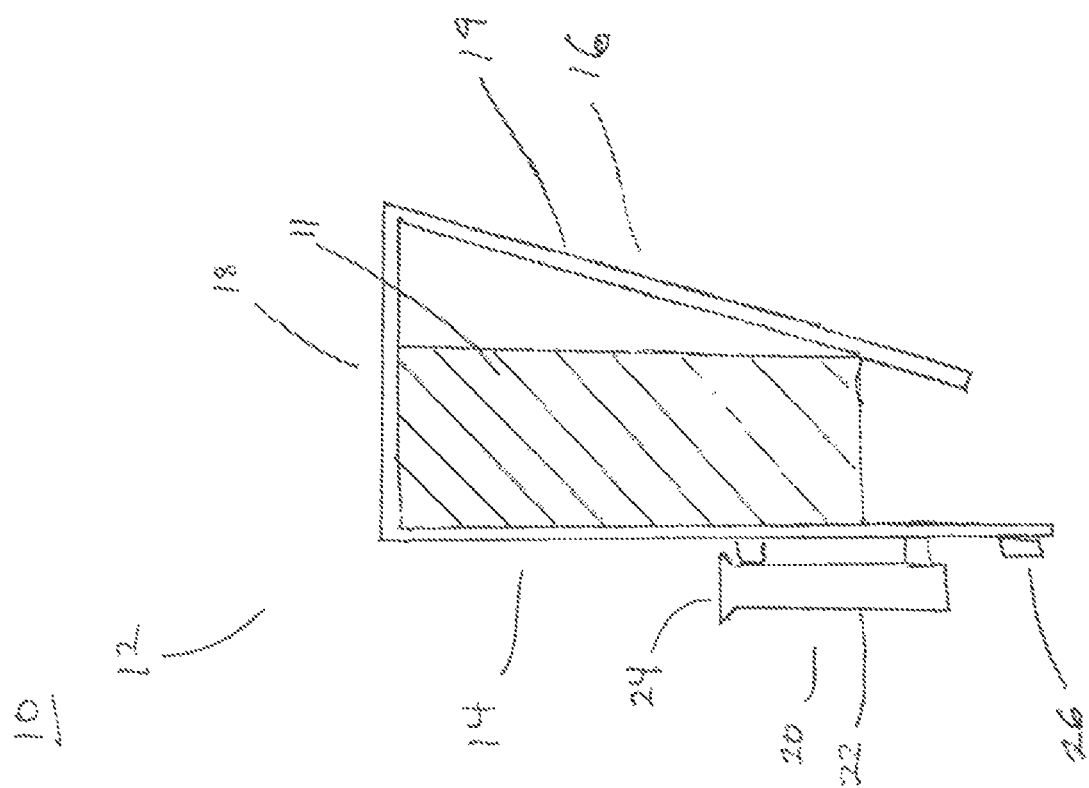
FIG. 6 is a side view of a fishing pole tender system of the present invention mounted on a rectangular support structure, where the fishing pole tender system includes a base, a fishing pole holder, an accessory mounting portion, and a indented portion with a slanted configuration.

The indented portion 19 may have any shape designed to impart compressive force onto a support structure 11, conform to the shape of a support, structure 11, or both. The indented portion 19 can have an arcuate shape, as shown in FIG. 4. The indented portion 19 can have a V-shape, as shown in FIG. 5, or a slanted portion, as shown in FIG. 6.

As will be apparent, the indented portion may take on any number of shapes that result in the indented portion 19 imparting a compressive force on a support structure 11. For instance, the second side 16 if FIG. 6 includes an indented, portion 19 with a slanted portion that slants toward the first, side 14. Although not shown, indented portions 19 with a slanted portion that slants away from the opposing side can also be used. Similarly, indented portions 19 having an arcuate shape or a V-shape can also be reversed relative to the embodiments shown in FIGS. 4 and 5, respectively.

Figure 7:
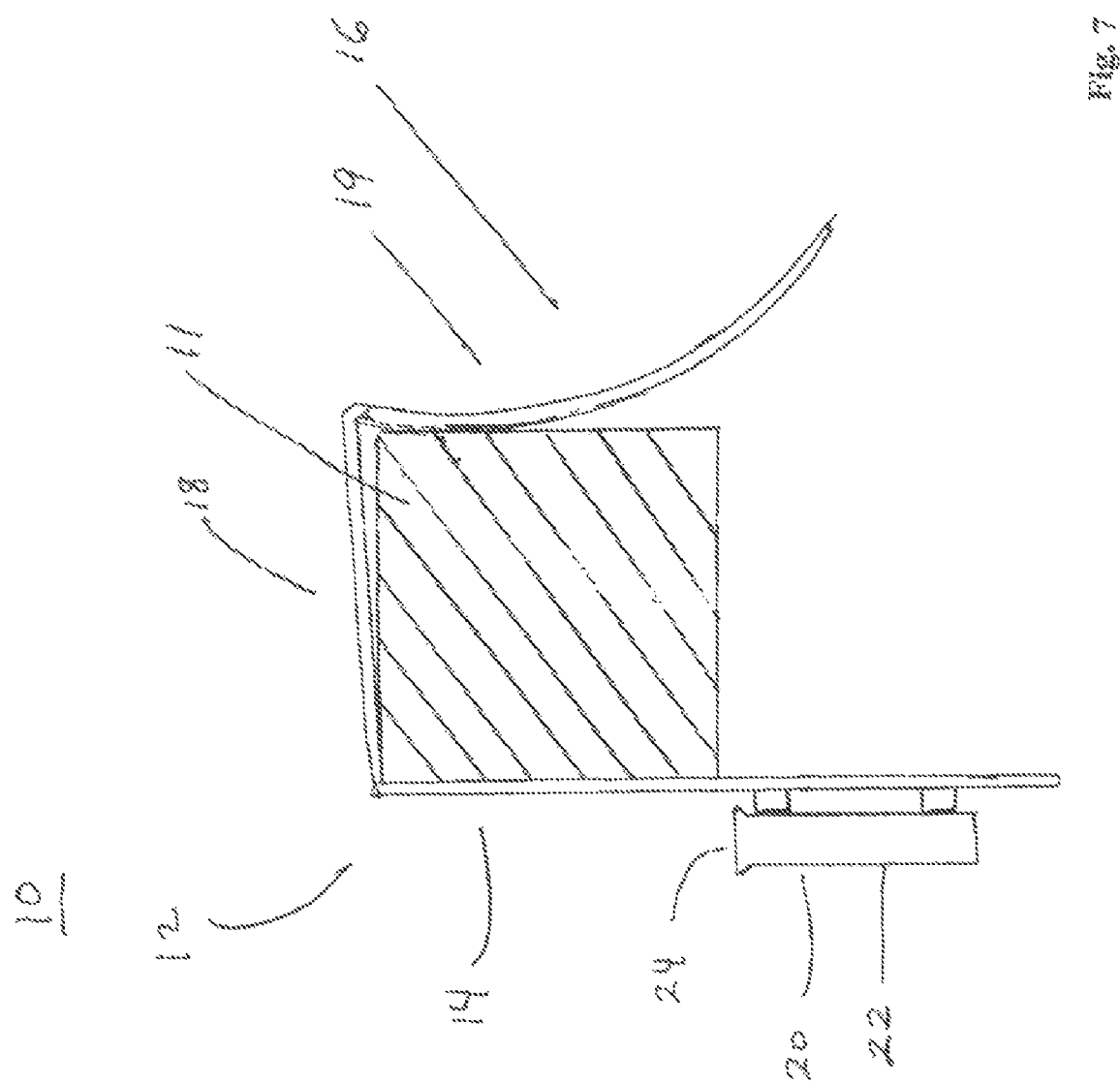
FIG. 7 is a side view of a fishing pole tender system of the present invention mounted on a rectangular support structure, where the fishing pole tender system includes a base, a fishing pole holder, and an arcuate indented portion.

FIG. 7 shows a fishing pole tender system 11) similar to that in FIG. 4 except that the support structure 11 is larger than in FIG. 4. The arcuate, V-shaped, and slanted indented portions 19 can be used to adapt the fishing pole tender system 10 to fit over support structures of varying sizes. For example, many clocks axe built using vertical four-by-four pilings, which have a 4" by 4" cross section, to support the dock. Such docks often include a railing constructed using two-by-four lumber. Thus, a fishing pole tender system 10 having a indented portion 19 designed for use with a two-by-four, as shown in FIGS. 3 & 4, could just as easily be used with a four-by-four, as shown in FIG. 7.

In another example, the fishing pole tender device 10 in FIGS. 1 & 2, can be designed for both round five inch diameter railings, but also securely attach to smaller two-by-four rails or four-by-four pilings. The FIGS. 1 & 2 design, may be shaped to impart compressive force and conform to the shape of a round railing, bat also impart a compressive force to a smaller support structure 11 made from two-by-four rails or four-by-font pilings. As will be appreciated by one of skill in the art, the sixes provided herein for support structures 11 are exemplary only and the base 12 may be sized, shaped or both, as appropriate to fit support structures 12 having different sizes and shapes.

Figure 8:
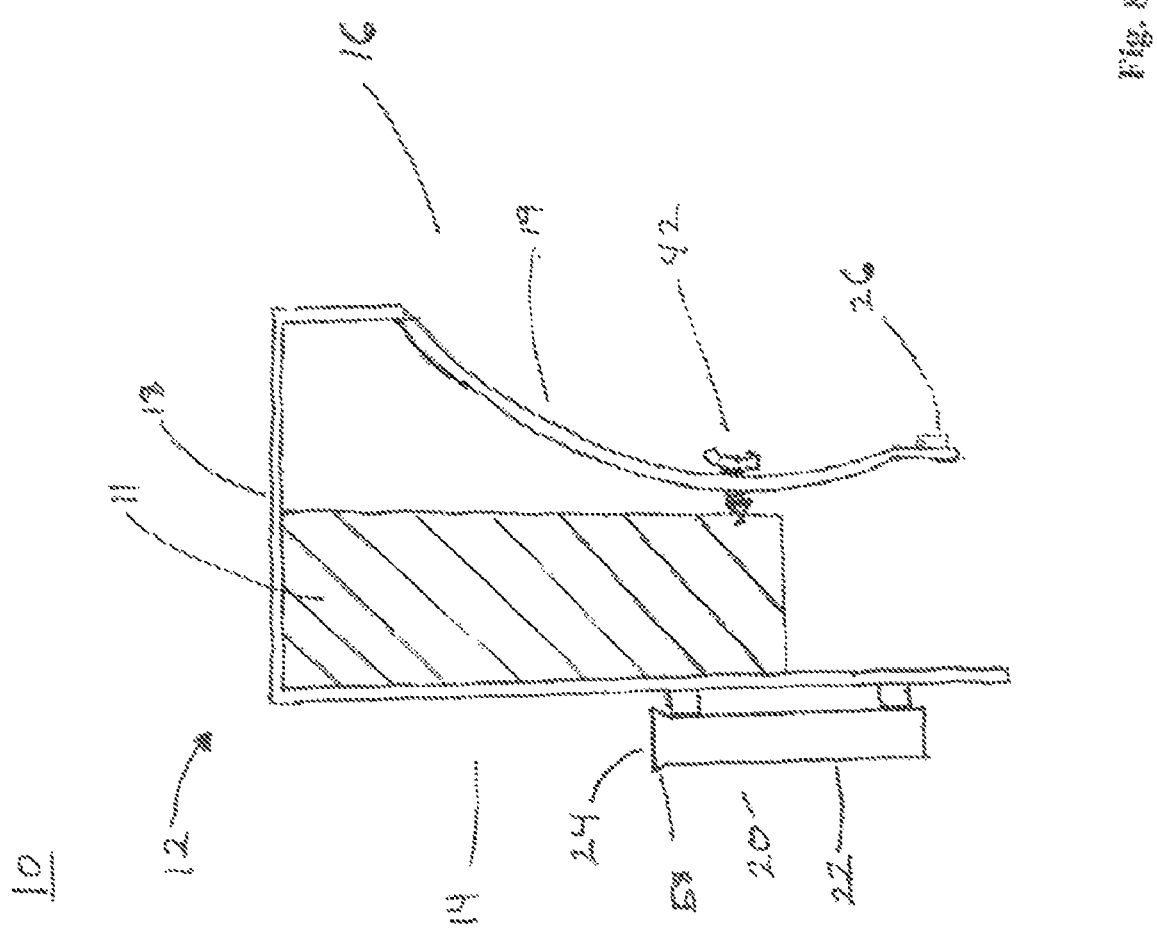
FIG. 8 is a side view of a fishing pole fender system of the present invention mounted on a rectangular support structure, where the fishing pole tender system includes a base, a fishing pole holder, an accessory mounting portion, an arcuate indented portion, and a securing screw.

At least one of the first side 14 and the second side 16 can include a securing screw 42 for improving attachment of the base 12 to a support structure 11. As shown in FIG. 8, the second side 16 may include a securing screw 42. The securing screw 42 may be used to impart additional compressive force onto the support structure 11. In addition, the sharp point of the securing screw 42 may serve to anchor the base 12 to the support structure 11. This is especially true for support structures 11, such as wood, that may be compacted when a concentrated force, such as the force exerted by the tip of the securing screw 42, are applied. Although die securing screw 42 may be driven into a support structure 11, a securing screw 42 need not be driven into the support structure 11 to achieve secure temporary attachment to a support structure 11.

Figure 19:
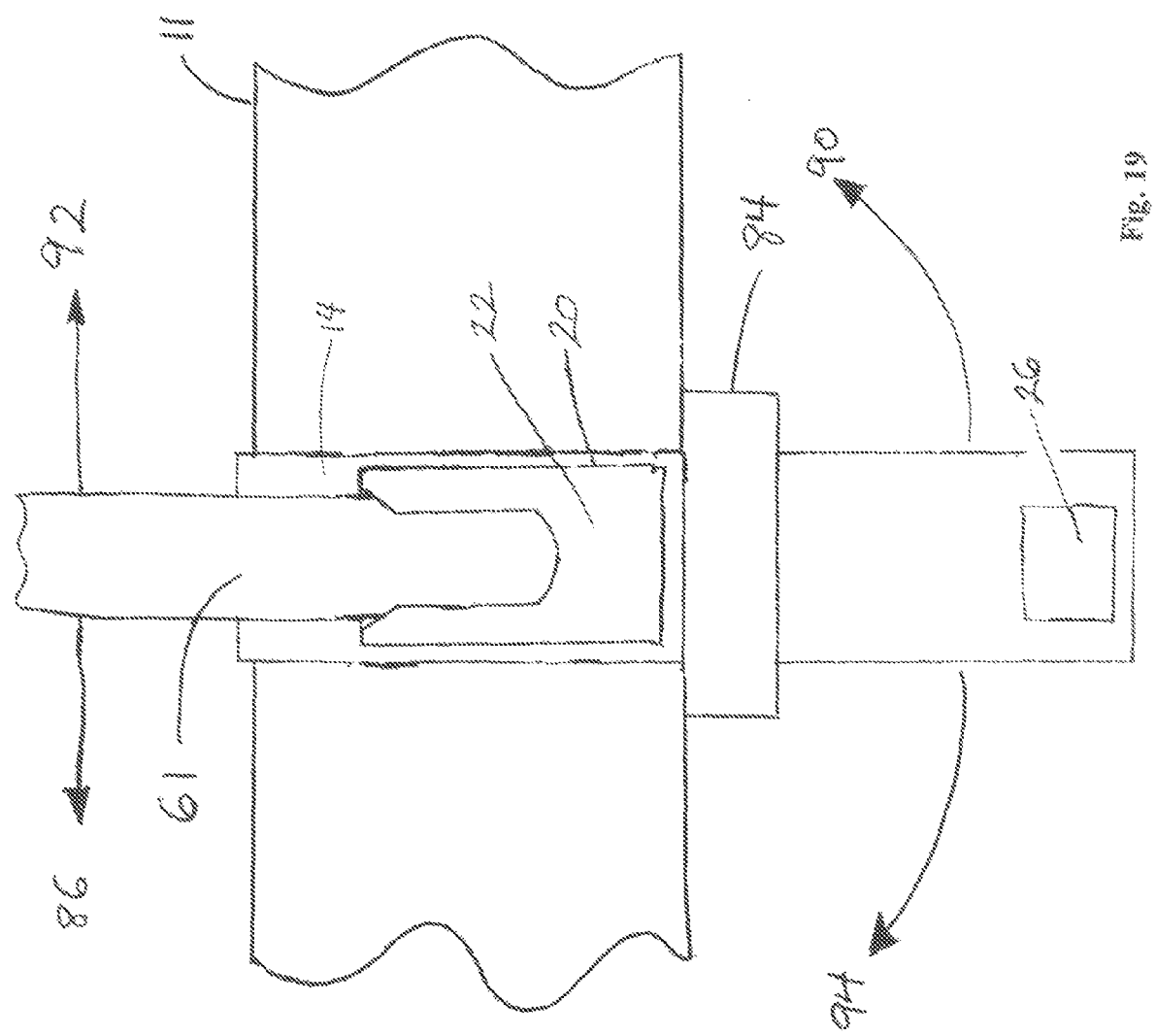
FIG. 19 is a trout view of a fishing pole tender system of the present invention mounted on a support structure, where the fishing pole tender system includes a base, a fishing pole holder, an accessory mounting portion, and a friction brake.
Figure 20:
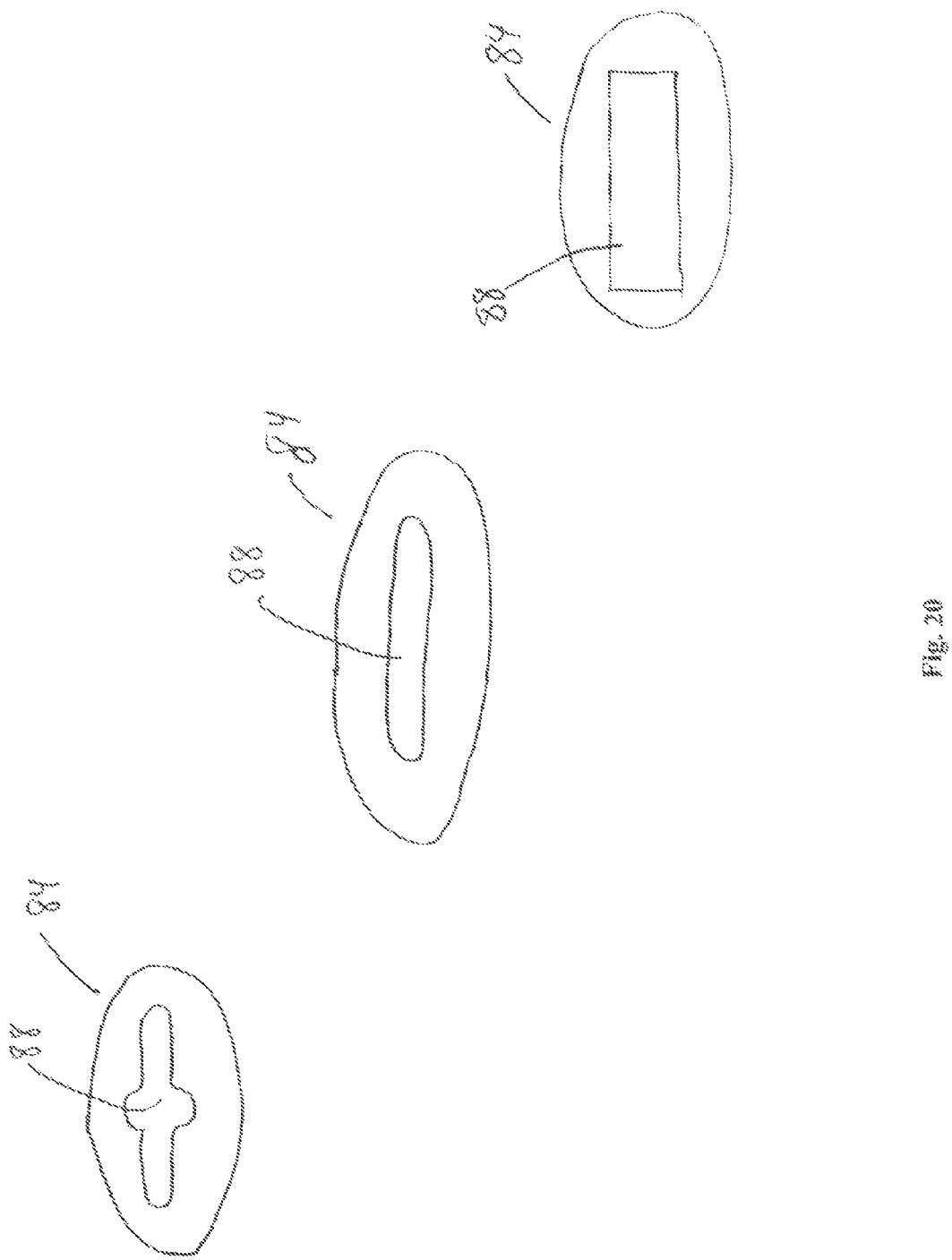
FIG. 20 is a top view of a friction brakes useful as part of the fishing pole fender system of the present invention.

As shown in FIGS. 19 & 20, the fishing pole tender system 10 may also include a friction brake 84. The friction brake 84 may be slidably moving along at least one of the first side 14 and the second side 16. The friction brake 84 can be slidably forced against a support structure 11 to winch the base 12 is temporarily attached. Thus applied, die friction brake 84 can help prevent the base 12 from, rotating 90 due to a lateral force 86 applied to the base 12. Similarly, the diction brake may help prevent the base 12 horn rotating 94 due to a lateral tome 92 applied in the opposite direction as lateral force 86. The fishing pole tender system 12 can include too or more friction brakes 84 that may be applied to the first side 14, the second side 16, or both 14, 16.

As used herein, "lateral forces" are the components of a three applied to the base 12 that are generally orthogonal, to the vertical, axis and a horizontal axis defined by die gap between the first side and the second side. For instance, where the support structure 11 is a horizontally oriented rail as in FIGS. 1 & 19, the long axis of the rail will define the lateral direction. Although lateral forces may arise from multiple sources, lateral forces will generally result from a fish pulling on the fishing pole 61 after being hooked or when the fishing pole tender system 12 is applied to an inclined railing 11.

The friction brake 84 can include a brake orifice 88 designed to correspond to the cross-sectional area of the first side 14, the second side 16, or both 14, 16. The brake orifice 88 may be designed with an interference tolerance, i.e. be smaller than the cross-sectional area of the first side 14, the second side 16, or both 14, 16. In some embodiments, the amount of interference may be at least 1%, in others the interference may be at least 5% or even at least 10%. In some embodiments, the friction broke 84 can include a locking mechanism to lock the friction brake 84 in place once the friction brake 84 is forced against the support structure 11.

Once a user slides the friction brake 84 into position on the first side 14, the second side 16, or both 14, 16, the friction brake 84 can remain securely forced against the support structure 11 until the user removes the friction brake 84. The diction brake 84 can comprise a material that imparts friction on foe side 14, 16 to winch it is applied, the support structure 11, or both. The friction brake 84 may be made of any number of materials, including plastic, rubber, metals, alloys, wood and combinations thereof. Although the brake orifices 88 in FIG. 20 are round, "plus" shaped and rectangular, the brake orifice 88 may have any shape that allows the brake 84 to slide over a able 14, 16 of the base 12 and remain securely forced against a support structure 11 until the user decides to remove the friction brake 84.

Figure 9:
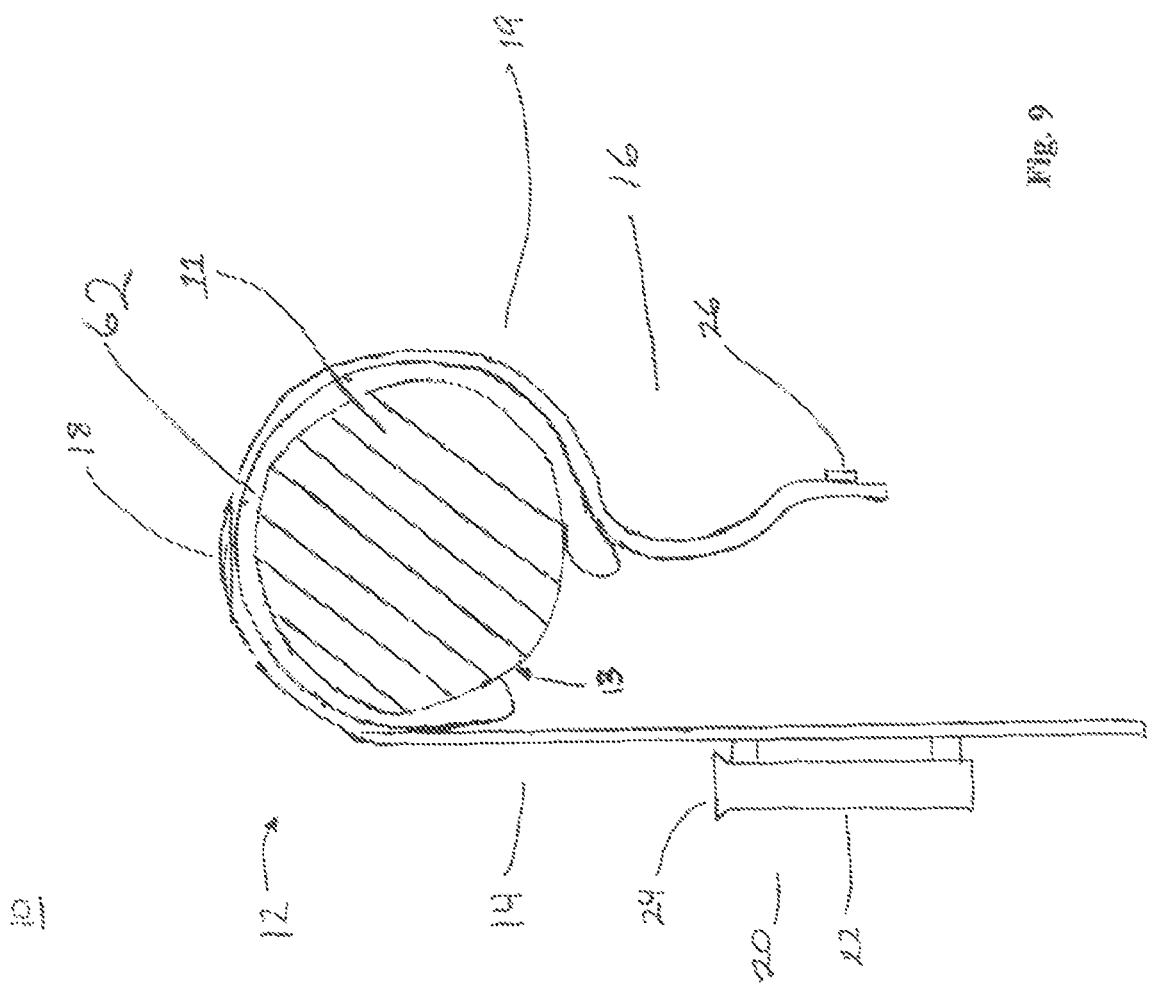
FIG. 9 is a side view of a fishing pole tender system of the present invention mounted on a round support structure, where the fishing pole tender system includes a base, a fishing pole holder, an accessory mounting portion, an arcuate indented portion, and a hushing.

The fishing pole tender system 10 may also include a bushing be for increasing friction between the base 12 and a support structure 11, protecting the surface 13 of a support structure 11 from the base 12, or both. As shown in FIG. 9, the hushing 62 can fit between the base 12 and the support structure 11. The presence of the bushing 62 can allow increased compressive force on the support structure 11 while minimizing damage to the surface 13 of the support structure 11. The bushing 62 can also be used to increase friction between the fishing pole tender system 10 and the support structure 11. The bushing 62 can be funned from any resilient material capable of increasing friction or minimizing damage to the surface 13 of the support structure 11. Exemplary bushing 62 materials include resilient, rubber and elastic materials, cloth materials, and the like.

The first side 14 of the fishing tender system 10, the second side 16 of the fishing tender system 10, or both, can include at least one accessory mounting portion 26 for interchangeably mounting one or more fishing accessories 28 to the base 12. In addition, the first side 14, the second side 15, or both can include a plurality of accessory mounting portions 26 for interchangeably mounting one or more fishing accessories 28, or a plurality of fishing accessories 28.

In some embodiments, one side 14, 16 of the system 10 will be longer than the other side 16, 14. For example, the side 14, 15 the fishing pole holder 20 is attached to may be longer than the opposite side 16, 14. The length of each side 14, 16, 18 is a design parameter that may be modified depending on the target support structure 11 and the desired functionality of the entire system 10. For instance the sides 14, 16 may be short for a compact system 10; however, a side 14, 16 with a large number of accessory mounting portions 26 may be longer than the opposing side 16, 14.

When the base 12 of the fishing tender system 10 is attached to a support structure 11, the first side 14 and the second side 16 can extend generally vertically and the intermediate portion 18 can extend generally horizontally. As used herein, "generally vertically" means that, when the base 12 is mounted to a support structure 11, a side 14, 16 extends bother vertically than horizontally. For example, the second side 16 in FIG. 2 has a first end 90 and a second end 92. The second side 16 extends generally vertically since the ratio of the vertical distance 94 traveled to the horizontal distance 96 traveled is greater than 1:1. In particular, an item is oriented generally vertically where the ratio of the vertical distance to the horizontal distance of a side 14, 16, from end to end, is greater than about 1:1 preferably greater than about 2:1 and more preferably greater than about 3:1.

As used herein, "generally horizontally" means that, when the base 12 is mounted to a support structure 11, the intermediate portion 18 extends further horizontally than vertically. In particular, the ratio of the horizontal distance to the vertical distance of the intermediate portion 18 is greater than about 1:1, preferably greater than about 2:1.

Figure 10:
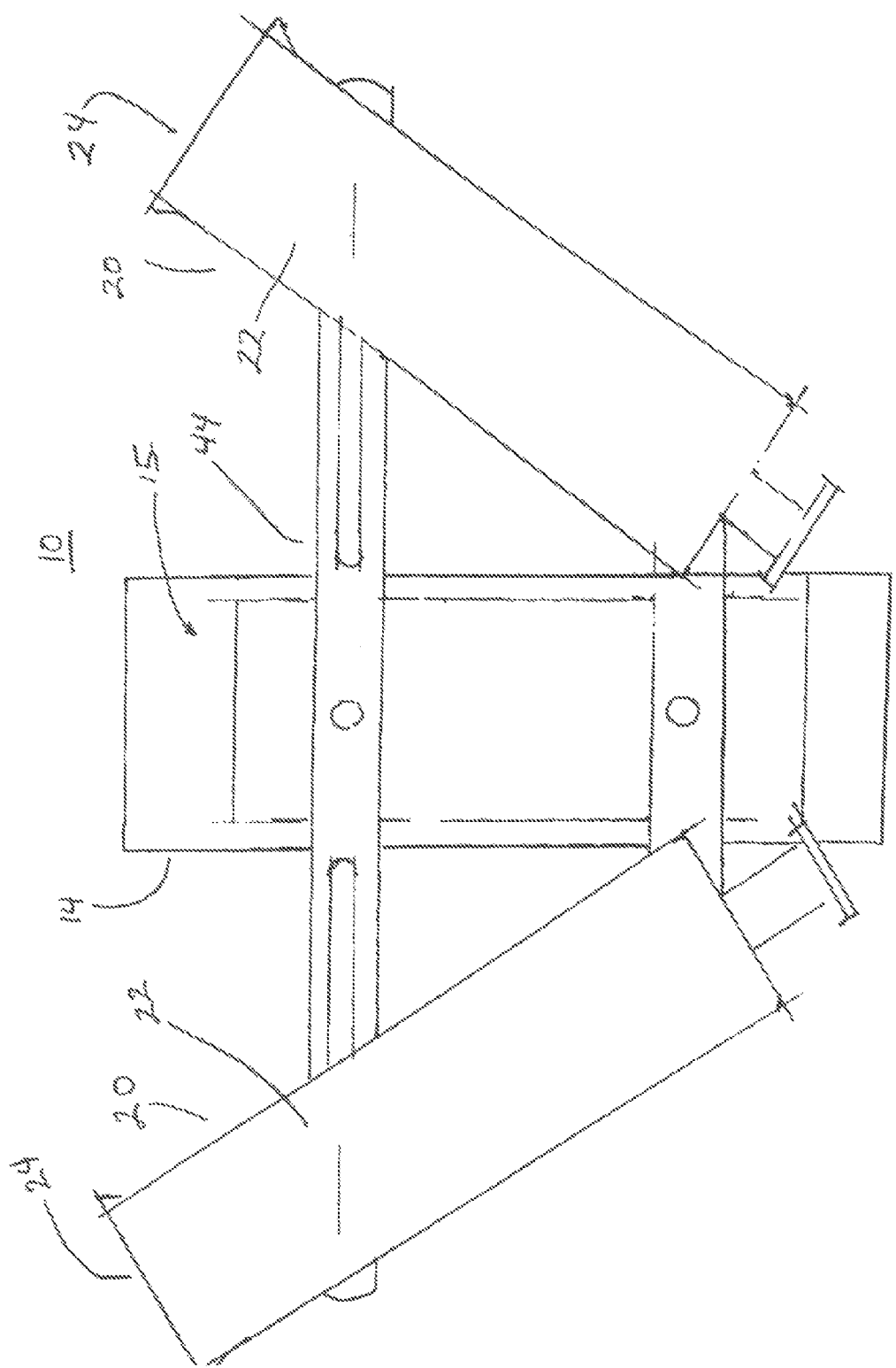
FIG. 10 is a front view of a multi-rod mounting device having two fishing rod holders useful for the present invention.

The at least one fishing pole holder 20 can be securely attached to the first side 14 of the base 12 such that the at least one fishing pole holder 20 is oriented generally vertically, as shown in FIGS. 1-9. As shown in FIG. 10, a plurality of fishing pole holders 20 can be attached to a multi-rod mount 44 brat is securely attached to the first side 14 of the base 12 and each fishing pole holder 20 can be oriented generally vertically. This allows the fishing pole holders to rotate such that the pole tips are spaced from one another and prevents tangling of the line.

Figure 11:
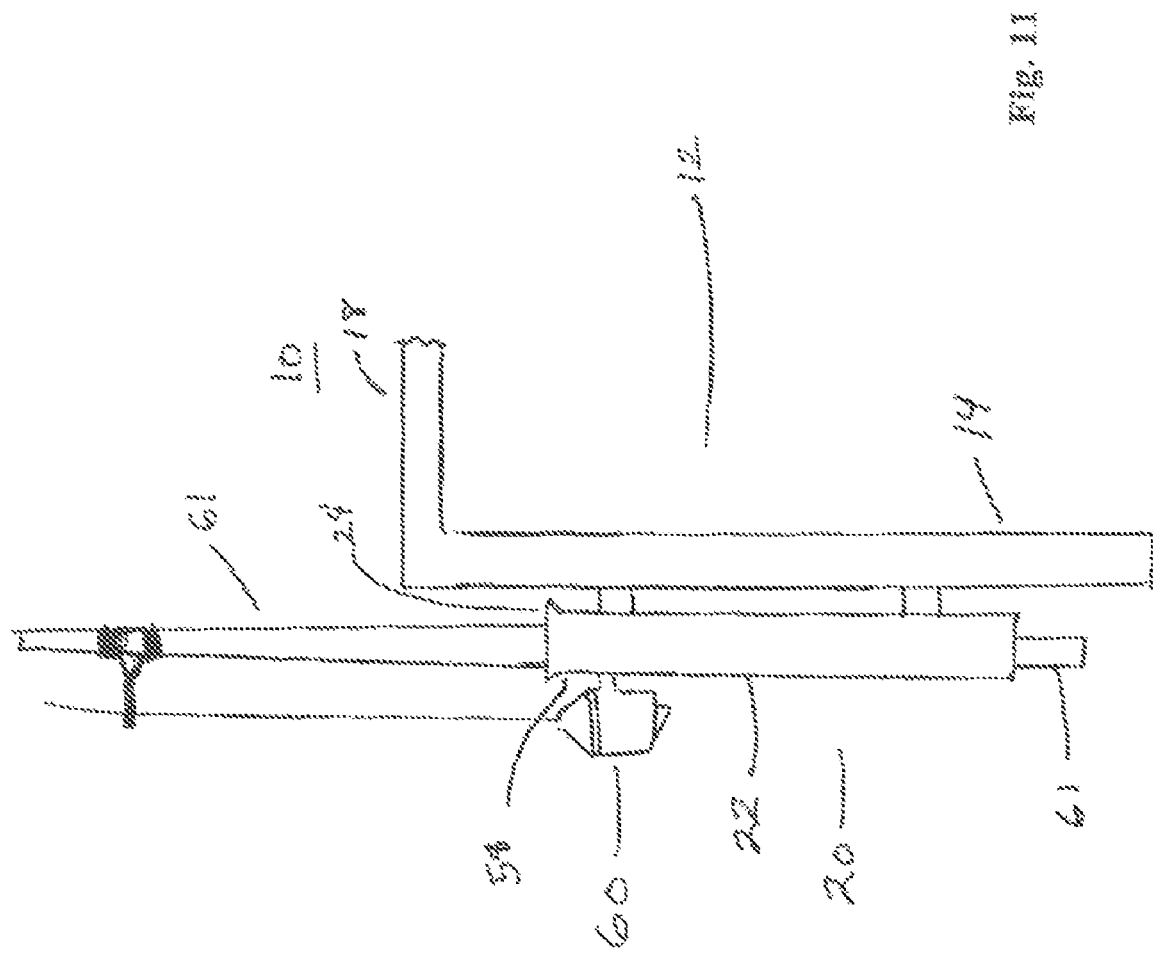
FIG. 11 is a side view of a fishing pole tender system of the present invention showing a fishing pole held by a fishing pole holder having an open first end with a notch, in it.
Figure 12:
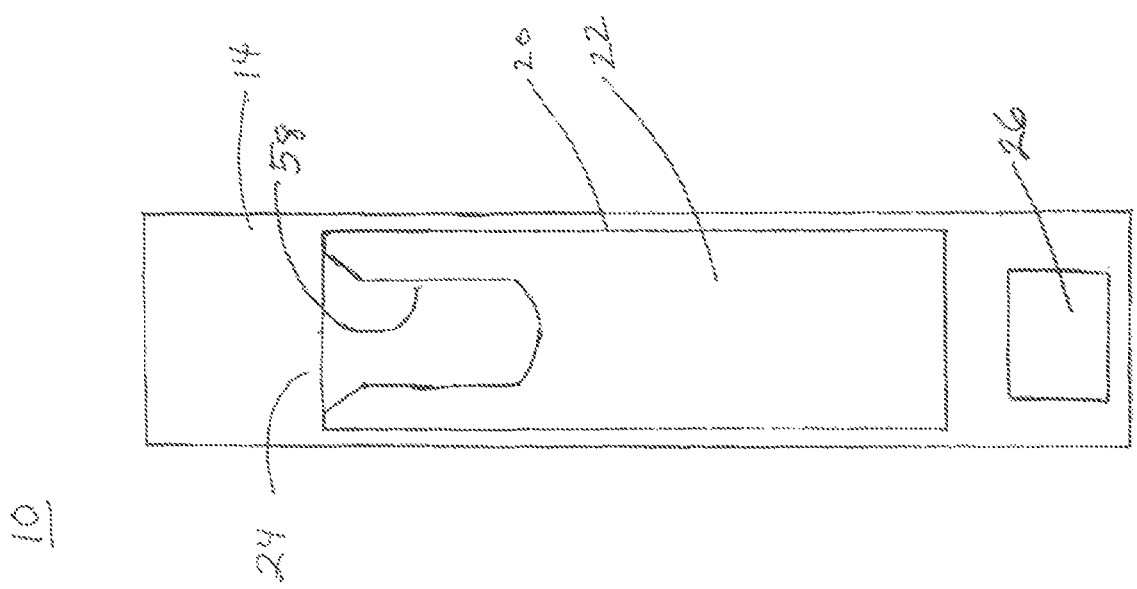
FIG. 12 is a trout view of a fishing pole tender system of the present invention showing a fishing pole holder having an open first end with a notch, in it.

As shown in FIGS. 11 & 12, the open first end 24 of the fishing pole holder 20 can include a notch 33 for receiving a fishing reel 60. The notch 38 can be designed to prevent rotation of the pole within the fishing pole holder 20. The fishing pole holder 20 can be designed to allow force transfer from a fishing pole 61 in the fishing pole holder 20 to the base 12, which transfers the force to the support structure 11 and prevents the fishing pole 61 from pivoting out of the fishing pole holder 20 and into the water when the fish takes the bait.

Figure 13:
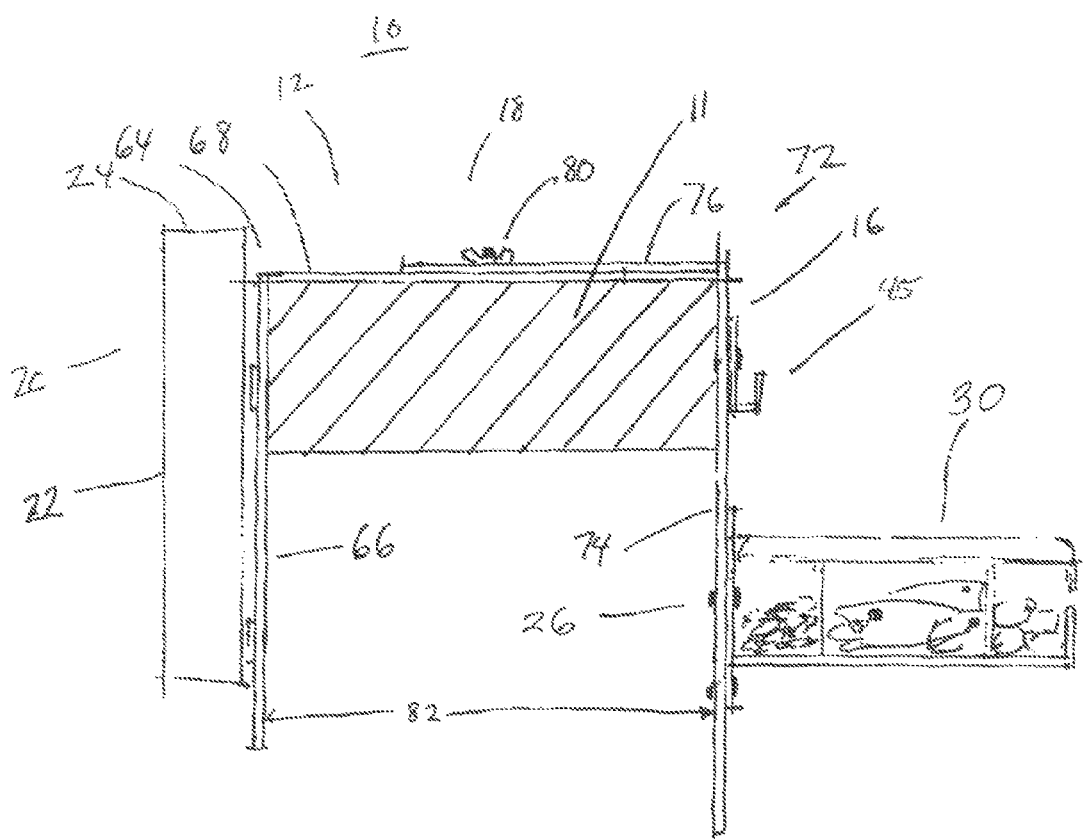
FIG. 13 is a side view of a fishing pole tender system of the present invention mounted on a rectangular support structure, where the fishing pole tender system includes a base composed of two discrete L-shaped portions, a fishing pole holder, a plurality of accessory mounting portions and a tackle box mounted thereto.
Figure 14:
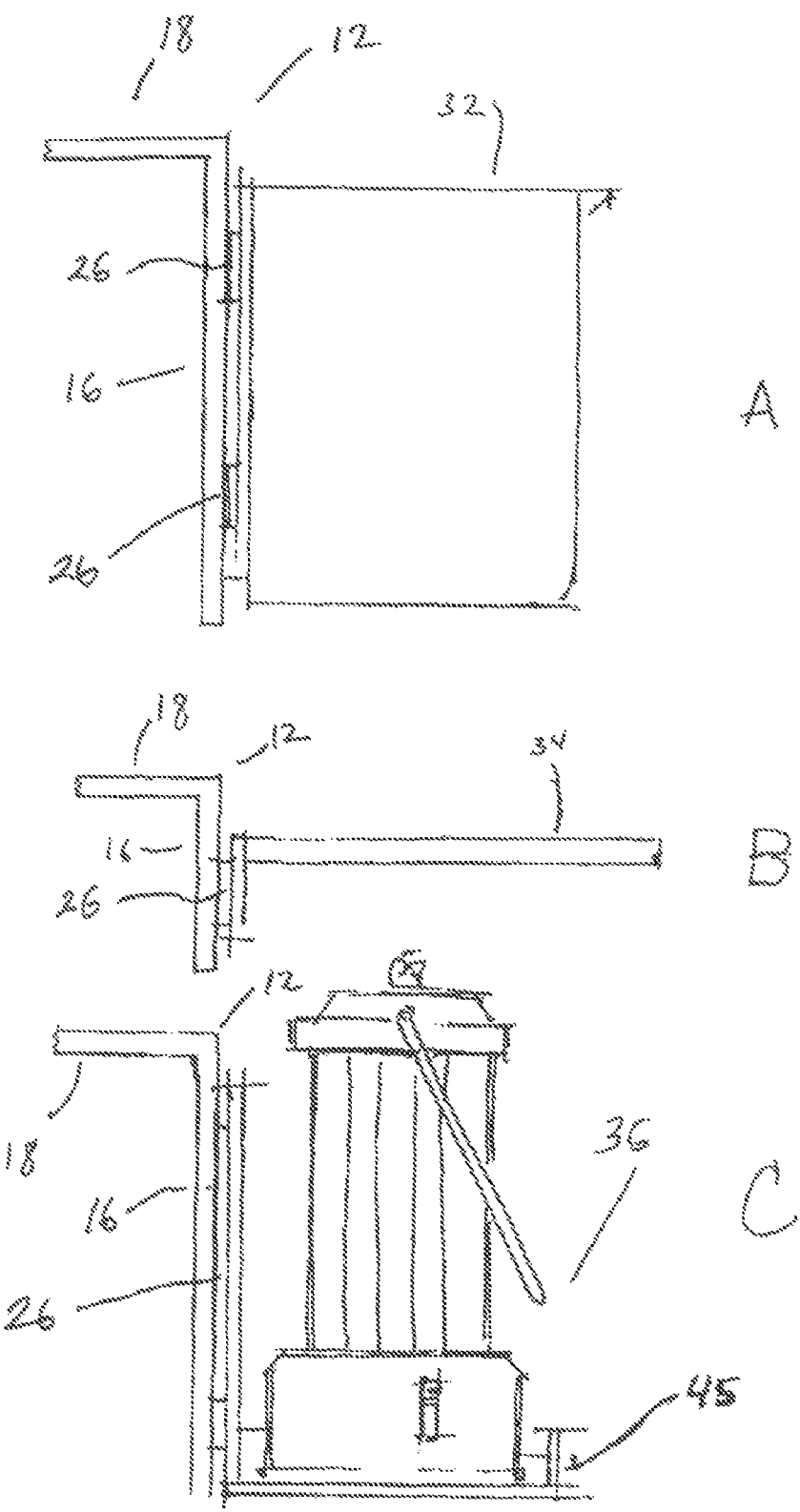
FIG. 14 is a slue view of a fishing pole tender system of the present invention showing several different fishing accessories mounted thereto.
Figure 15:
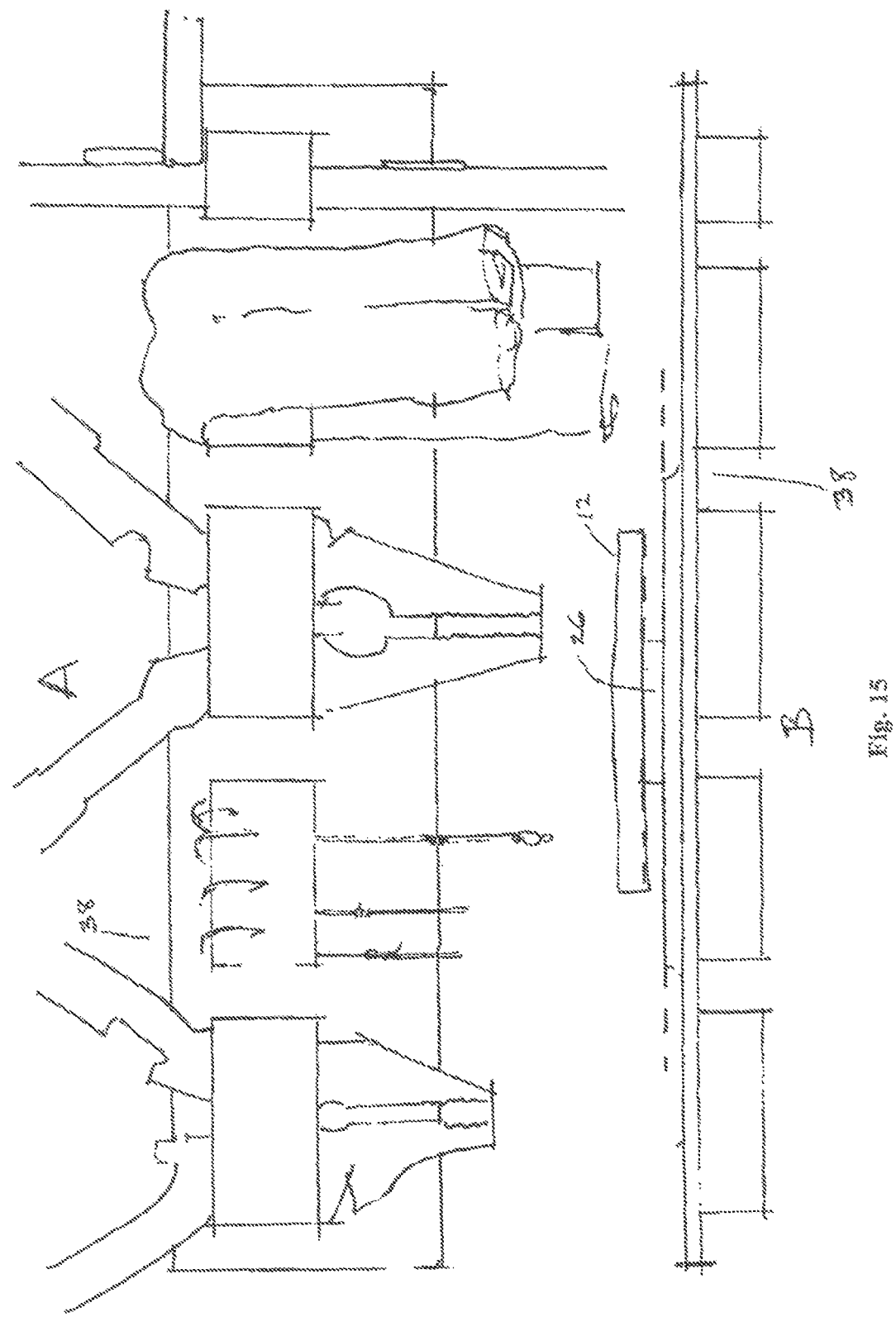
FIG. 15A is a front view of a tool holder of a fishing pole tender system of the present invention.
FIG. 15B is a top view of a tool holder of the present fishing pole tender system attached to the first side of the base.

The fishing pole tender system 10 can also include at least one fishing accessory 28 for cantilevered mourning to the at least one accessory mounting portion 26, as shown in FIGS. 13-15. The at least one fishing accessory 28 for cantilevered mounting can be a tackle box 30, a bait bucket 32, a cutting board 34, a light holder 36, a tool holder 38, a drink holder, a combination of these, or other accessories useful while fishing. As used herein, "cantilevered mounting" is used to refer to any mounting method used to mount a fishing accessory 28 at one end, where the center of mass of the fishing accessory 28 is not directly below the accessory mounting portion 26. In general, when cantilevered mounting is used, the fishing accessory 28 will be mourned to the base 12 at one end of the fishing accessory 28 and the base 12 will provide a counter farce to prevent the fishing accessory 28 from banging in a generally horizontal position. In some instances where cantilevered mounting is used, the fishing accessory will extend generally horizontally.

At least one of the fishing accessories 28 can be cantilever mounted to the base 12. Cantilever mounting is possible using the fishing pole tender system 10 because the base 12 is generally rigid and can provide sufficient force to allow the fishing accessories 28 to extend generally horizontally morn the base 12 without, rotating or dangling due to gravity. This is true whether or not there is a surface, such as a supporting structure 11, directly behind die accessory mounting portion 26 where the cantilevered mounting occurs.

As shown in FIG. 13, a tackle box 30 may be cantilever mounted to the base 12 such that the tackle box extends horizontally away from the base 12. Similarly, FIG. 14 shows a bait bucket 32, a cutting board, 34 and a light holder 36, mounted to a base 12 using a cantilever mounting mechanism. A tool holder 38 with loops to hold live or more tools is shown in FIG. 15.

In light of the present disclosure, it will be apparent that additional fishing accessories 28 may be mounted or cantilever mounted to the base 12 as described herein. These additional fishing accessories 28 are envisioned as part old the present invention.

The at least one accessory mounting portion 26 of the fishing pole tender system 10 may be a bracket 45, bracket and slot, screw and keyhole 48, snap fit 50, screw and nut 52, key and slot, hook and, loop, whether fabric or otherwise, or a combination, of these. Bach of these accessory mounting portions 26 may be used for cantilevered mounting of any of the fishing accessories 28.

Figure 16:
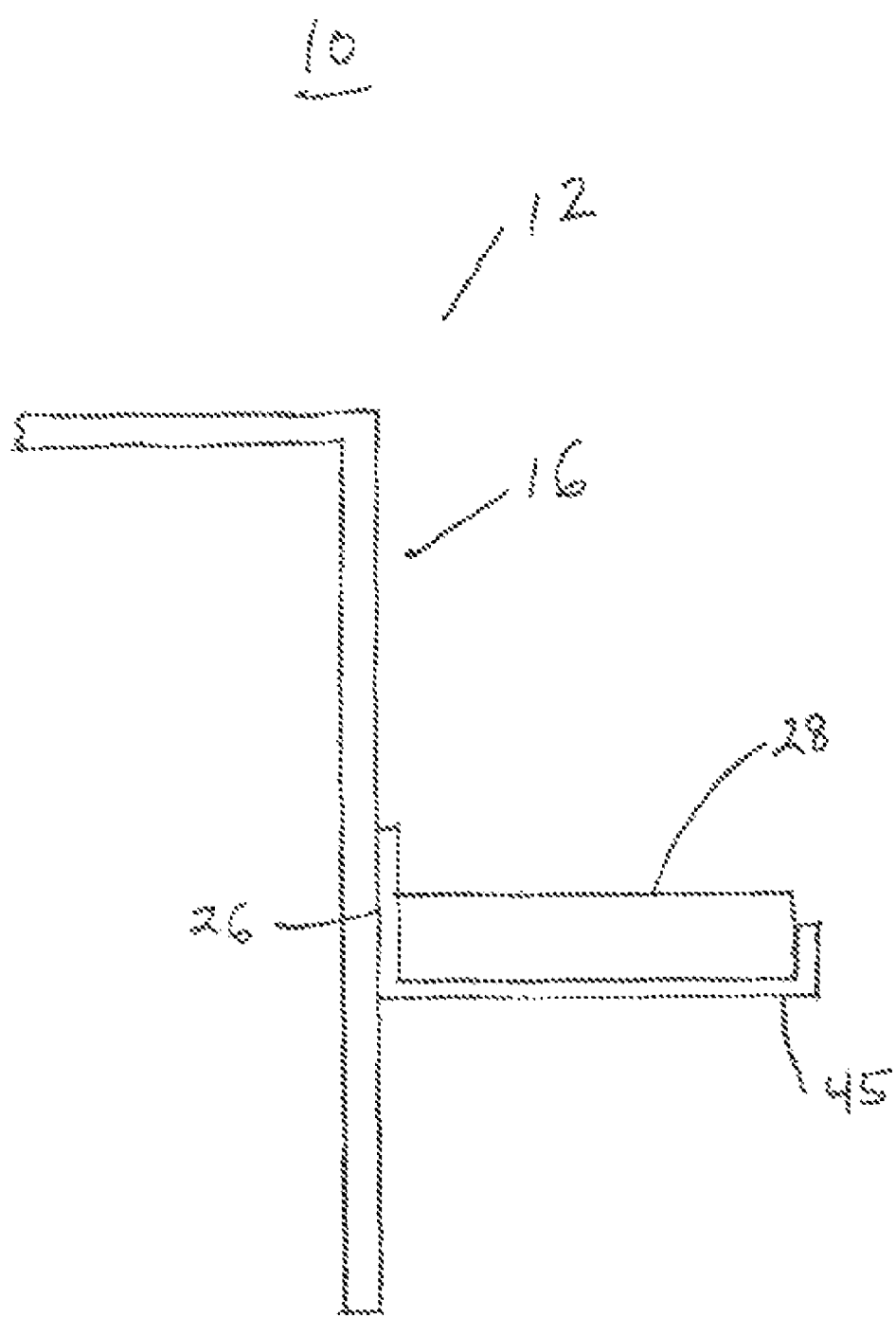
FIG. 16 is a side view of a fishing pole tender system of the present invention, where the fishing pole tender system includes a bracket attached to the accessory mounting portion and a fishing accessory disposed thereon.

The accessory mounting portion 26 of the fishing pole tender system 10 may be a bracket 45, as shown in FIG. 16. Fishing accessories 28 including tackle boxes 30, bait buckets 32, cutting boards 34 and lights 36 may be placed on the bracket and interchangeably mounted to the base 12 using a single bracket 45. For additional stability, multiple brackets 45 may be mounted adjacent to one another from a single accessory mounting portion 26. If multiple brackets are used, they may be horizontally displaced from one another so that they may jointly bear the weight of the fishing accessory 28. As will be apparent, a wider single bracket can provide additional stability compared to a narrower single bracket 45, and a fishing accessory 28 will be more stable in a bracket 45 if the length of the fishing accessory 28 is approximately the same as, or slightly greater than, the length of the bracket 45.

Figure 17:
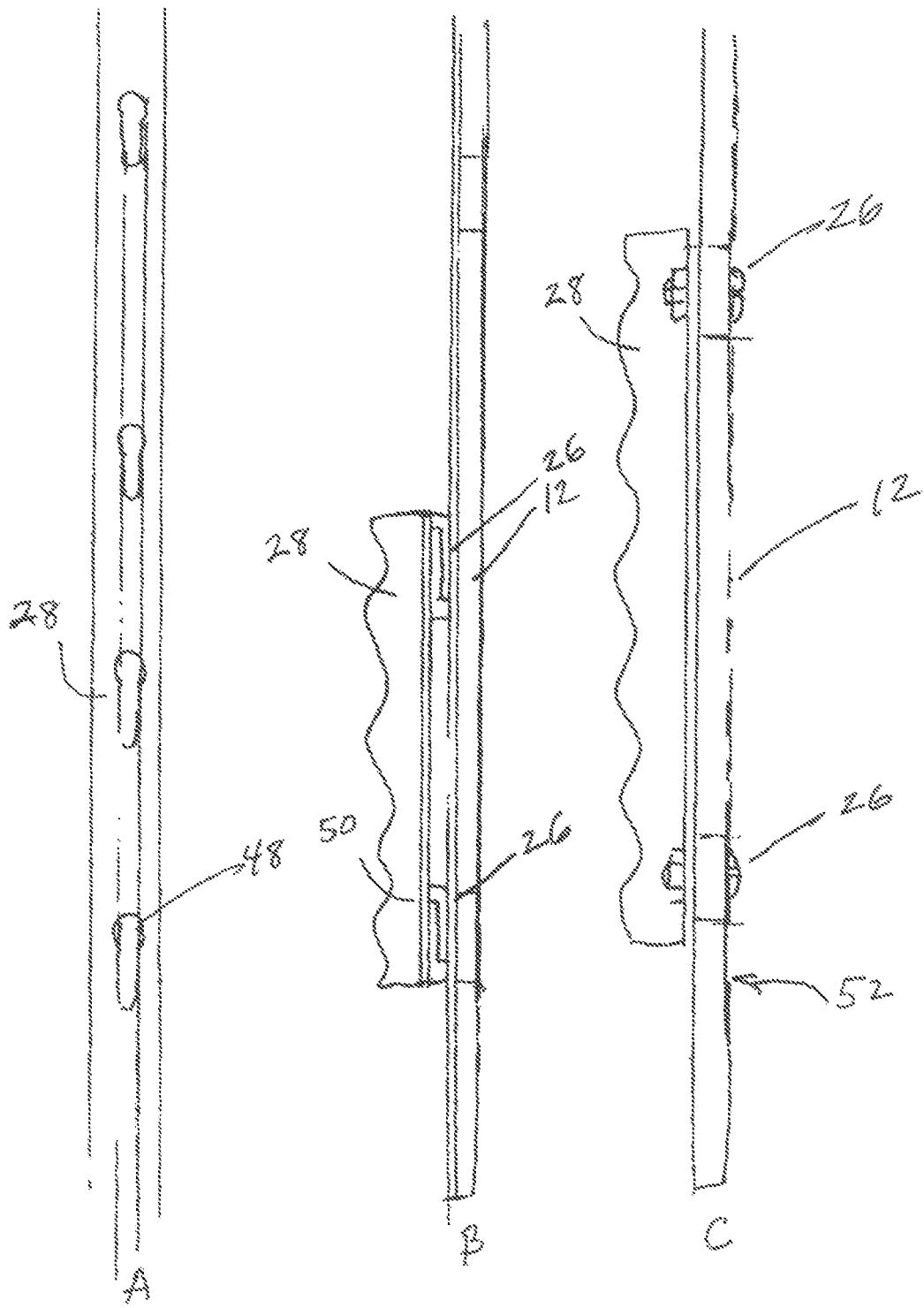
FIG. 17A is a from, view of the keyhole portion of a screw and keyhole portion of an accessory mounting portion of the present invention.
FIG. 17B is a side view of one snap fit embodiment of an accessory mounting portion of the present invention.
FIG. 17C is a side view of a screw and nut embodiment of an accessory mounting portion of the present invention.

As shown in FIG. 17, the accessory mounting portion 26 may include a screw and keyhole 48, a snap fit 50, or a screw and nut 52 configuration or any other suitable mounting configuration. Although not shown, a fabric hook and loop configuration such as that sold under the trade name Velcro® may also be used. Each of these mounting approaches may be used to achieve the desired cantilever mounting. Cantilevered mounting enables the fishing pole tender system 10 to securely attach fishing accessories 28 such as tackle boxes 30, bait buckets 32, cutting boards 34 and lights 36 to both flat and rounded rails. The cantilever mounting mechanism enables mounting of fishing accessories 28 in a manner that is more convenient and useful that other loom of mounting, in fact, some fishing accessories 28, for example cutting boards, tackle boxes, and bait buckets, could not be usefully mounted without cantilevered mounting.

Each of the accessory mounting mechanisms is useful for interchangeably mounting fishing accessories 28. A fishing pole tender system 10 of the invention may include a plurality of mounting portions 26 and fishing accessories 28 that utilize the same mounting method. This allows complete interchangeability of fishing accessories 28 and mounting portions 26. In the alternative, a fishing pole tender system 10 can include different mounting methods for different fishing accessories 28 or for different accessory mounting positions 26. This can be useful where the load created by one fishing accessory 28 is larger or more dynamic than the load created by other fishing accessories 28. For example, four brackets 45 may be provided, which may be used to bang one large fishing accessory 28, such as a bait bucket, two medium fishing accessories 28, or four smaller fishing accessories 28.

Figure 18:
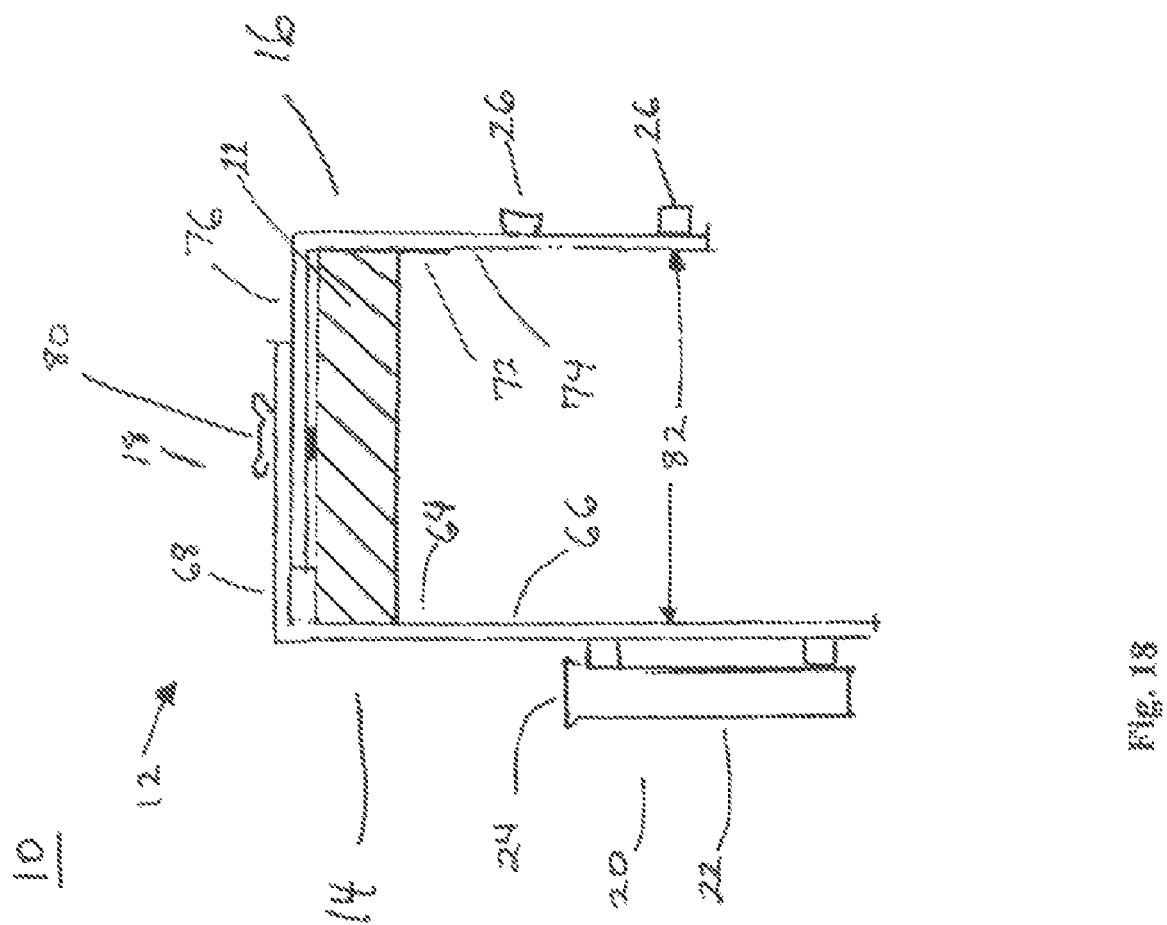
FIG. 18 is a side view of a fishing pole tender system of the present invention mounted on a rectangular support structure, where the fishing pole tender system modules a base composed of eve discrete L-shaped portions, a fishing pole holder and a plurality of accessory mounting portions.

As shown in FIG. 18, the present invention, is also directed to a fishing pole tender system 10 for attachment to a support structure 11, where the fishing pole tender system 10 includes a base 12 with a generally rigid frame having a first side 14 and a second side id opposite die first side 14. The first side 14 and the second side 16 can be physically connected and spatially separated by an intermediate portion 18 such that a support, structure 11 can fit between the first side 14 and the second side 16 and the intermediate portion 18 can rest on the support structure 11. When the base 12 is attached to a support structure 11, the first side 14 and the second side 16 can extend generally vertically and the intermediate portion 18 can extend generally horizontally. The first side 14, the second side 16, or both, can include at least one accessory mounting portion 16 bar interchangeably mounting a plurality of fishing accessories 28 to the base 12. The fishing note tender system 10 can also include at least one fishing pole holder 20 comprising an elongated hollow sleeve 22 having an open first end 24, wherein the at least one fishing pole holder 20 can be securely attached to the first side 14 or the second side 16 of the base 12.

The base can include a first L-shaped portion 64 and a second L-shaped portion 72. The first L-shaped portion 64 can include a first leg 66 and a second leg 08, where the first leg 66 of the first L-shaped portion 64 can be the first side 14 of the base 12 and the second leg 68 of the first L-shaped portion 64 can be a first connecting sale 68. The second L-shaped portion 72 can include a first leg 74 and a second leg 76, where the first leg 74 of the second L-shaped portion 72 can be the second side 16 of the base 12 and the second leg 76 of the second L-shaped portion can be a second connecting side 70. The connecting sides 68, 76 of the L-shaped portions 64, 72 are connected together and can form the intermediate portion 18 of the base 12. The length of the intermediate portion 18 can be adjusted by controlling the amount of overlap between the connecting sides 68, 76. The connecting sides 68, 76 can include a locking mechanism 80 for setting the gap 82 between the first side 14 and the second side 10 to enable secure attachment of the fishing pole tender system 10 to support structures 11 of different sizes. The first and second L-shaped portions 64, 72 can be slidably adjustable to fit support structures 11 of varying widths.

The locking mechanism 80 may include any mechanism known for temporarily locking the relative position of two pieces of material. Exemplary examples include a screw and nut, fabric book and loop material, sack as that sold under the trade name Velcro®, a clamp, removable pin and doles, key and slot, and others.

In a specific embodiment of the fishing pole tender system 10, the fishing pole holder 20 can be attached to the first side 14 and the second side 16 can include at least one accessory mounting portion 26. This allows the rod 61 and reel 60 to hang on the water-side of the support structure 11, and provides the angler easy access to the fishing accessories 28 on the dry-side of the support structure 11.

The foregoing is provided for purposes of illustrating, explaining, and describing embodiments of ibis invention. Modifications and adaptations to these embodiments will be apparent to those skilled in the art and may be made without departing from the scope or sped of this invention.

We claim:

1. A fishing pole tender system for attachment to a support structure, comprising:
    a single-piece base comprising a generally rigid frame comprising a first side and a second side opposite the first side, the single-piece base being made of metal,
        wherein the first side and the second side are physically connected and spatially separated by a horizontal intermediate portion such that a support structure fits between the first side and the second side, the first side comprises a flat portion extending vertically downward from the support structure;
        wherein the second side comprises an indented portion comprising solely a concave arcuate shape, and prior to connection to the support structure, a top portion of the concave arcuate shape of the indented portion curves inward toward the first side and a bottom portion of the concave arcuate shape of the indented portion curves outward from the first side; and
        wherein the indented portion is resiliently deformable such that the single-piece base can be temporarily and securely attached on the support structure by pushing the single-piece base over the support structure such that the indented portion exerts sufficient force on the support structure so that the fishing pole tender system remains steady without additional securing means during use, and the indented portion on the second side (1) extends generally vertically with respect to the support structure, and (2) provides secure attachment of the single-piece base to the support structure by imparting compressive force to a vertical surface of the support structure; and at least one fishing pole holder comprising a hollow sleeve having an open first end, wherein the at least one fishing pole holder is securely attached directly to the flat portion of the first side of the single-piece base, and the bottom of the second side comprising the indented portion extends vertically to at least approximately a mid-portion of the at least one fishing pole holder attached to the first side to facilitate force transfer from a fishing pole in the at least one fishing pole holder to the single-piece base, which in turn transfers the force to the support structure when a fish takes bait on the fishing pole during use.

2. The fishing pole tender system of claim 1, wherein the first side, the second side, or both, comprise at least one accessory mounting portion for interchangeably mounting one or more fishing accessories to the single-piece base, such that the single-piece base supports the one or more fishing accessories vertically with respect to the support structure.

3. The fishing pole tender system of claim 1, further comprising at least one fishing accessory for cantilevered mounting to at least one accessory mounting portion for interchangeably mounting one or more fishing accessories to the single-piece base.

4. The fishing pole tender system of claim 3, wherein at least one fishing accessory for cantilevered mounting is selected from group consisting of a tackle box, a bait bucket, a cutting board, a light holder, a tool holder, a drink holder, and combinations thereof.

5. The fishing pole tender system of claim 1, wherein the at least one accessory mounting portion is a mounting system selected from the group consisting of bracket, bracket and slot, screw and keyhole, snap fit, screw and nut, hook and loop, key and slot, and combinations thereof.

6. The fishing pole tender system of claim 1, wherein the fishing pole tender system may be mounted on at least one support structure selected from the group consisting of a dock rail, a jetty rail, a boat rail, and a bridge rail.

7. The fishing pole tender system of claim 1, wherein the open first end of the fishing pole holder comprises a notch for receiving a fishing reel, wherein the notch runs along a longitudinal length of the fishing pole holder and allows better force transfer from a fishing pole in the fishing pole holder to the single-piece base.

8. A fishing pole tender system for attachment to a support structure, comprising:

a single-piece base comprising a generally rigid frame comprising a first side and a second side opposite the first side, the single-piece base being made of metal, wherein the first side and the second side are physically connected and spatially separated by a horizontal intermediate portion such that a support structure fits between the first side and the second side, the first side comprises a flat portion extending vertically downward from the support structure;

wherein the second side comprises an indented portion comprising a slanted portion, the slanted portion of the indented portion bending inward toward the first side; and wherein the indented portion is resiliently deformable such that the single-piece base can be temporarily and securely attached on the support structure by pushing the single-piece base over the support structure such that the indented portion exerts sufficient force on the support structure so that the fishing pole tender system remains steady without additional securing means during use, and the indented portion on the second side (1) extends generally vertically with respect to the support structure, and (2) provides secure attachment of the single-piece base to the support structure by imparting compressive force to a vertical surface of the support structure; and at least one fishing pole holder comprising a hollow sleeve having an open first end, wherein the at least one fishing pole holder is securely attached directly to the flat portion of the first side of the single-piece base, and the bottom of the second side comprising the indented portion extends vertically to at least approximately a mid-portion of the fishing pole holder to facilitate force transfer from a fishing pole in the at least one fishing pole holder to the single-piece base, which in turn transfers the force to the support structure when a fish takes bait on the fishing pole during use.

9. The fishing pole tender system of claim 8, wherein the bottom of the second side comprising the indented portion extends vertically to at least approximately to a bottom portion of the fishing pole holder to facilitate force transfer from a fishing pole in the at least one fishing pole holder to the single-piece base.

10. The fishing pole tender system of claim 8, wherein the open first end of the fishing pole holder comprises a notch for receiving a fishing reel, wherein the notch runs along a longitudinal length of the fishing pole holder and allows better force transfer from the fishing pole in the fishing pole holder to the single-piece base during use.

11. The fishing pole tender system of claim 8, wherein after the single-piece base is pushed onto the support structure, the indented portion conforms to a shape of the support structure.

12. The fishing pole tender system of claim 8, wherein the first side, the second side, or both, comprise at least one accessory mounting portion for interchangeably mounting at least one fishing accessory to the single-piece base.

13. The fishing pole tender system of claim 12, further comprising at least one fishing accessory for cantilevered mounting to the at least one accessory mounting portion.

14. The fishing pole tender system of claim 13, wherein the at least one fishing accessory for cantilevered mounting is selected from the group consisting of a tackle box, a bait bucket, a cutting board, a light holder, a tool holder, a drink holder, and combinations thereof.

15. The fishing pole tender system of claim 12, wherein the at least one accessory mounting portion is a mounting system selected from the group consisting of bracket, bracket and slot, screw and keyhole, snap fit, screw and nut, hook and loop, key and slot, and combinations thereof.

16. The fishing pole tender system of claim 8, wherein the fishing pole tender system may be mounted on at least one support structure selected from the group consisting of a dock rail, a jetty rail, a boat rail, and a bridge rail.

17. The fishing pole tender system of claim 1, wherein the bottom of the second side comprising the indented portion extends vertically to at least approximately to a bottom portion of the at least one fishing pole holder attached to the first side to facilitate force transfer from a fishing pole in the at least one fishing pole holder to the single-piece base.

* * * * *